US012800546B2

(12) United States Patent
Kimura et al.

(10) Patent No.: US 12,800,546 B2
(45) Date of Patent: Nov. 17, 2026

(54) MEASUREMENT SYSTEM AND LIQUID DELIVERY CONTROL METHOD

(71) Applicant: HITACHI HIGH-TECH CORPORATION, Tokyo (JP)

(72) Inventors: Ryusuke Kimura, Tokyo (JP); Motohiro Yamazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 844 days.

(21) Appl. No.: 17/797,588

(22) PCT Filed: Mar. 6, 2020

(86) PCT No.: PCT/JP2020/009879
§ 371 (c)(1),
(2) Date: Aug. 4, 2022

(87) PCT Pub. No.: WO2021/176735
PCT Pub. Date: Sep. 10, 2021

(65) Prior Publication Data
US 2023/0046895 A1 Feb. 16, 2023

(51) Int. Cl.
*G01N 27/447* (2006.01)

(52) U.S. Cl.
CPC .............................. *G01N 27/44704* (2013.01)

(58) Field of Classification Search
CPC ..... G01N 27/44704; G01N 2001/4038; G01N 27/447–44752; G01N 27/44756–453; B01L 2400/0421
See application file for complete search history.

(56) References Cited

U.S. PATENT DOCUMENTS

2001/0017263 A1* 8/2001 Shoji ................ G01N 27/44704 204/600
2002/0003091 A1 1/2002 Kojima et al.
(Continued)

FOREIGN PATENT DOCUMENTS

CN 107209149 A 9/2017
JP H05040876 A 6/1993
(Continued)

OTHER PUBLICATIONS

Saito et al., English translation of JP-2008209138-A, 2008 (Year: 2008).*
Aritome et al., English translation of WO2019026133, 2019 (Year: 2019).*
(Continued)

*Primary Examiner* — James Lin
*Assistant Examiner* — Sommer Yousef Osman
(74) *Attorney, Agent, or Firm* — Miles & Stockbridge, P.C.

(57) ABSTRACT

Provided is the technique for efficiently using the phoresis medium contained in the phoresis medium container by minimizing the remaining phoresis medium as small as possible, and further lowering the running cost. The disclosure proposes the measurement system as an example, which includes an electrophoresis device and a computer. The electrophoresis device includes a phoresis medium container for storing a phoresis medium, a capillary having its inside filled with the phoresis medium, a delivery mechanism for delivering the phoresis medium in the phoresis medium container to the capillary, and a device control section for controlling an operation of the delivery mechanism. The computer calculates a deliverable number of times from an amount of the phoresis medium in the phoresis medium container and an estimated delivery amount of the phoresis medium delivered by the delivery mechanism (see FIG. 16).

2 Claims, 20 Drawing Sheets

(56) References Cited

U.S. PATENT DOCUMENTS

| | | | | |
|---|---|---|---|---|
| 2004/0018638 | A1* | 1/2004 | Shoji | G01N 27/44713 436/516 |
| 2008/0041724 | A1 | 2/2008 | Ozawa et al. | |
| 2016/0216235 | A1* | 7/2016 | Miyata | G01N 27/44721 |
| 2018/0059055 | A1* | 3/2018 | Kimura | G01N 27/44721 |
| 2019/0250125 | A1* | 8/2019 | Aritome | G01N 27/44782 |

FOREIGN PATENT DOCUMENTS

| | | | | | |
|---|---|---|---|---|---|
| JP | H10010134 | A | | 1/1998 | |
| JP | 2001324473 | A | | 11/2001 | |
| JP | 2006275962 | A | * | 10/2006 | |
| JP | 2008008621 | A | | 1/2008 | |
| JP | 2008209138 | A | * | 9/2008 | |
| WO | WO-2018055714 | A1 | * | 3/2018 | G01N 27/44743 |
| WO | WO-2019026133 | A1 | * | 2/2019 | G01N 27/447 |

OTHER PUBLICATIONS

Yamazaki et al., English translation of JP2006275962A, 2006 (Year: 2006).*

Aritome et al., English translation of WO-2018055714-A1, 2018 (Year: 2018).*

Gocardless et al., How to Calculate a Regression Line, 2022, https://gocardless.com/guides/posts/how-to-calculate-a-regression-line/, pp. 1-10 (Year: 2022).*

Office Action mailed Jan. 17, 2024 in Chinese Application No. 202080095347.2.

"SeqStudioTM Genetic Analyzer Instrument and Software User Guide", Thermo Fisher Scientific Inc, Publication No. MAN0016138, Mar. 2019, pp. 12-15 and19-20.

Search Report mailed Jun. 23, 2020 in International Application No. PCT/JP2020/009879.

Written Opinion mailed Jun. 23, 2020 in International Application No. PCT/JP2020/009879.

* cited by examiner

MEASUREMENT SYSTEM AND LIQUID DELIVERY CONTROL METHOD

TECHNICAL FIELD

The present disclosure relates to a measurement system and a liquid delivery control method.

BACKGROUND ART

Recently, a capillary electrophoresis device configured to fill the capillary with a phoresis medium such as a polymer gel and a polymer solution has been widely distributed as the electrophoresis device.

The capillary electrophoresis device as disclosed in Patent Literature 1 has been widely used. Unlike the electrophoresis device of flat plate type, the capillary electrophoresis device exhibits higher heat dissipation and applies higher voltage to the sample. Accordingly, the device is advantageous for attaining high-speed electrophoresis. The capillary electrophoresis device provides many advantages, for example, consumption of small amount of sample, automatic filling of the phoresis medium, automatic injection of sample, and the like. The device has been widespread for various types of separation analysis measurement including analysis of nucleic acid and protein.

CITATION LIST

Patent Literature

Patent Literature 1: Japanese Unexamined Patent Application Publication No. 2008-8621

SUMMARY OF INVENTION

Technical Problem

The generally employed capillary electrophoresis device as disclosed in Patent Literature 1 is configured to deliver the phoresis medium stored in the phoresis medium container to the capillary. When the number of deliveries reaches the predetermined number of usages (the number of deliveries: set value), the phoresis medium container in use is replaced with a new one.

Even when the number of deliveries exceeds the predetermined value, there may be the case that the phoresis medium container in use has a substantial amount of residual phoresis medium. As the phoresis medium is quite costly, it is preferable to use up the phoresis medium as much as possible for lowering the running cost.

In light of the foregoing circumstance, the present disclosure presents the technique that allows efficient use by reducing the residual amount of phoresis medium stored in the phoresis medium container as small as possible, and further lowers the running cost.

Solution to Problem

The structure according to the claims will be employed for solving the foregoing problem. The disclosure includes multiple measures to solve the problem. The disclosure proposes a structure exemplified as a measurement system which includes an electrophoresis device and a computer. The electrophoresis device includes a phoresis medium container for storing a phoresis medium, a capillary having its inside filled with the phoresis medium, a delivery mechanism for delivering the phoresis medium in the phoresis medium container to the capillary, and a device control section for controlling an operation of the delivery mechanism. The computer calculates a deliverable number of times based on an amount of the phoresis medium in the phoresis medium container and an estimated delivery amount of the phoresis medium delivered by the delivery mechanism.

Further characteristics relating to the disclosure will be clarified by the following description of the specification and the drawings. An embodiment of the disclosure is attained and implemented by means of elements, combination of various elements, and detailed description and aspects of appended claims. The description of the specification is made merely for illustrative purpose, and it is not intended to limit claims or applied examples in any sense.

Advantageous Effects of Invention

The disclosure allows efficient use of the phoresis medium stored in the phoresis medium container by reducing the residual amount as small as possible for further lowering the running cost.

DESCRIPTION OF EMBODIMENT

Figure 1:
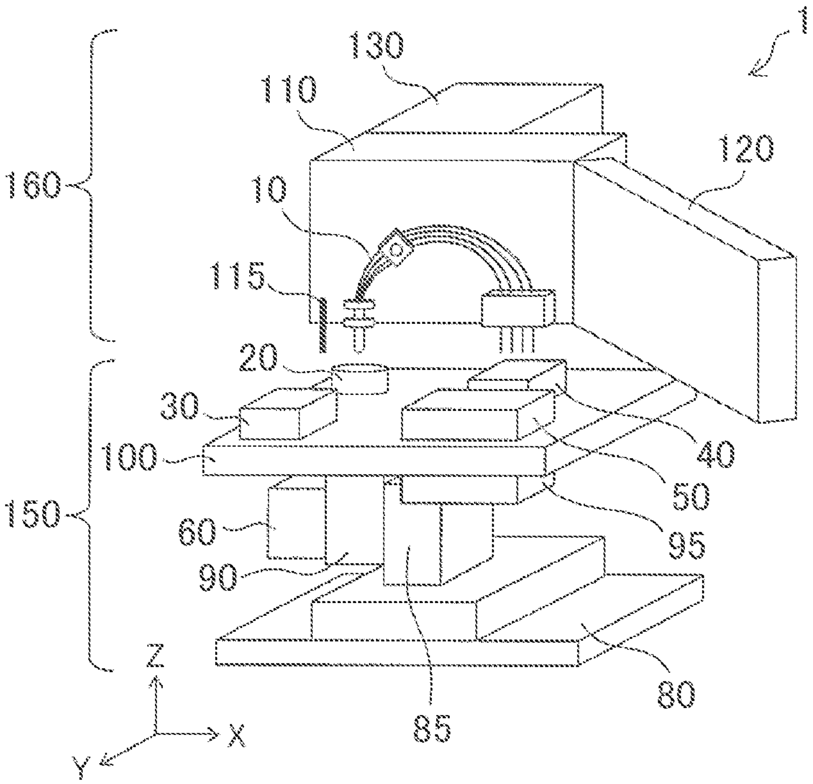
FIG. 1 schematically illustrates an exemplified structure of a capillary electrophoresis device 1 according to an embodiment.

An embodiment will be described referring to the drawings. The drawings illustrate specific examples according to a principle of the embodiment. The drawings are intended to be of help to understand the embodiment, and should not be used for restrictive interpretation of the disclosed technology.

The phoresis medium container has a syringe structure like an injector, and is set in a guide part for suppressing expansion of the container. The guide part with high rigidity allows expansion of the phoresis medium container until it comes in contact therewith so that further expansion can be suppressed.

The phoresis medium container is connected to the capillary in the following manner. That is, multiple capillaries are bundled into one to be provided with a capillary head having a needle-like acute tip. The capillary head pierces through a rubber plug attached to the phoresis medium container for connection between the phoresis medium container and the capillary. In this case, the capillary head is pressed against the rubber plug to suppress expansion thereof under the delivery pressure.

A seal part that is movable for delivery is incorporated in the phoresis medium container having the syringe structure. A seal surface of the seal part has the shape and thickness so that it is deformable under the inner pressure more easily than the container syringe. The seal part may be formed into a recess shape directed inward of the container so that the top part of the recess shape serves as the seal surface. The container has an inner-pressure seal structure which is further sealed upon increase in the inner pressure.

The phoresis medium is delivered by externally applying a pressing force to the seal part of the phoresis medium container. A delivery mechanism having a plunger for pressing the seal part is provided with an encoder which detects change in speed upon contact of the plunger with the seal part. After delivery of the phoresis medium, the inner pressure of the phoresis medium container has been kept high to apply the force for returning the seal part to its original position. In this state, the plunger which has been in contact with the seal part is separated. This moves the seal part toward the original position so that the inner pressure of the phoresis medium container is released.

The present invention serves to suppress expansion of the phoresis medium container so that the container can be made resistant to high pressure. The position of the seal part in the phoresis medium container is detected, and the residual pressure in the phoresis medium container is removed. This makes it possible to manage the residual amount in the phoresis medium container, and delivery amount. The foregoing effects can be attained by the phoresis medium container having inexpensive delivery function. This makes it possible to lower the running cost and improve user's workability.

Exemplified Device structure

Explanations will be made with respect to structure and arrangement of a capillary electrophoresis device 1, structure of a main component, and a setting method.

FIG. 1 illustrates an exemplified structure of the capillary electrophoresis device 1 according to an embodiment. The device 1 may be mainly divided into two units, that is, an autosampler unit 150 disposed in the lower section of the device, and an irradiation detection/thermostatic bath unit 160 disposed in the upper section of the device. As described later, the capillary electrophoresis device 1 is also connected to a system control computer 2 for controlling the device 1.

The autosampler unit 150 has a Y-axis driver 85 mounted on a sampler base 80 for driving operations in a Y-axis direction. A Z-axis driver 90 is mounted on the Y-axis driver 83 for driving operations in a Z-axis direction. A sample tray 100 is mounted on the Z-axis driver 90. A user sets a phoresis medium container 20, an anode-side buffer solution container 30, a cathode-side buffer solution container 40, and a sample container 50 on the sample tray 100. The sample container 50 is set above the X-axis driver 95 mounted on the sample tray 100, which is only allowed to be driven on the sample tray 100 in the X-axis direction. A delivery mechanism 60 is also mounted on the Z-axis driver 90. The delivery mechanism 60 is disposed below the phoresis medium container 20.

The irradiation detection/thermostatic bath unit 160 includes a thermostatic bath unit 110 and a thermostatic bath door 120, which allow the inner temperature to be kept constant. An irradiation detection unit 130 is mounted behind the thermostatic bath unit 110 to allow detection upon electrophoresis. The user sets a capillary array 10 in the thermostatic bath unit 110 where electrophoresis is executed while keeping temperature of the capillary array 10 constant so that detection is executed by the irradiation detection unit 130. The thermostatic bath unit 110 is provided with an electrode 115 for discharging to GND upon high voltage application for electrophoresis.

As described above, the capillary array 10 is fixed to the thermostatic bath unit 110. The autosampler unit 150 allows the phoresis medium container 20, the anode-side buffer solution container 30, the cathode-side buffer solution container 40, and the sample container 50 to be driven in the y-axis and Z-axis directions. Furthermore, the sample container 50 can only be driven in the X-axis direction. Movement of the autosampler unit 150 allows the phoresis medium container 20, the anode-side buffer solution container 30, the cathode-side buffer solution container 40, and the sample container 50 to be automatically connected to the fixed capillary array 10 at arbitrary positions.

Figure 2:
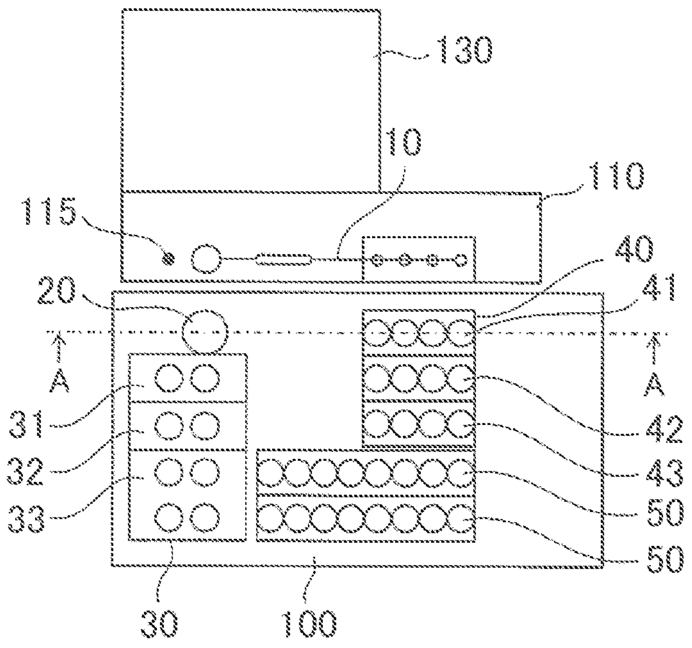
FIG. 2 is a top view of an exemplified structure of the capillary electrophoresis device 1 according to the embodiment.

FIG. 2 is a view of the capillary electrophororesis device 1 when seen from above. The anode-side buffer solution container 30 set on the sample tray 100 includes an anode-side cleaning layer 31, an anode-side electrophoresis buffer solution layer 32, and a sample introduction buffer solution layer 33. The cathode-side buffer solution container 40 includes a waste liquid layer 41, a cathode-side cleaning layer 42, and a cathode-side electrophoresis buffer solution layer 43.

The electrophoresis medium container 20, the anode-side buffer solution container 30, the cathode-side buffer solution container 40, and the sample container 50 are placed to form, an illustrated positional relationship. Those components are positionally related corresponding to the anode-side and the cathode-side upon connection to the capillary array 10, that is, "phoresis medium container 20-13 the waste liquid layer 41", "anode-side cleaning layer 31-cathode-side cleaning layer 42", "anode-side electrophoresis buffer solution layer 32-cathode-side electrophoresis buffer solution layer 43", and "sample introduction buffer solution layer 33-sample container 50".

Figure 3:
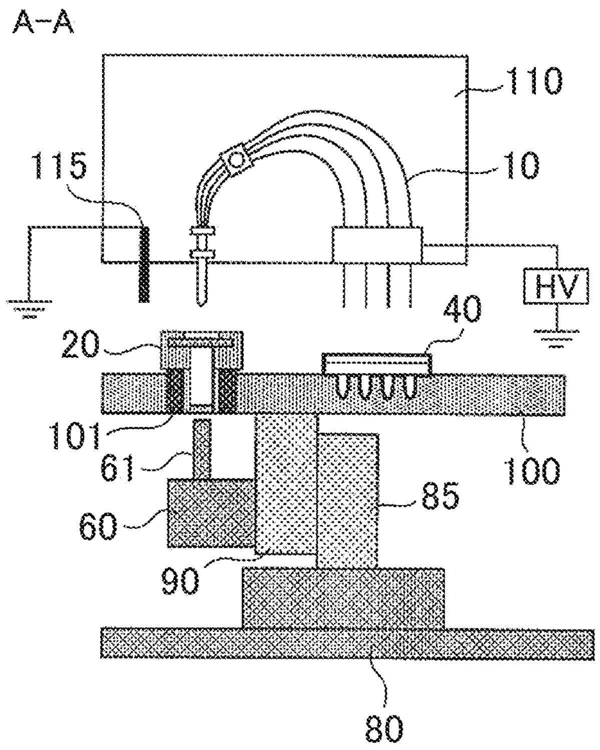
FIG. 3 is a sectional view of the capillary electrophoresis device 1 taken along line A-A.

FIG. 3 is a sectional view taken along line A-A of FIG. 2. The phoresis medium container 20 is set through insertion into a guide 101 embedded in the sample tray 100. The delivery mechanism, 60 is disposed so that a plunger 61 incorporated in the delivery mechanism 60 is positioned below the phoresis medium container 20.

Referring to FIG. 3, upon execution of electrophoresis, the right side of the capillary array 10 becomes the cathode side, and the left side becomes the anode side. The electrophoresis is executed in the following manner. The autosampler unit 150 moves to the position corresponding to "the anode-side electrophoresis buffer solution layer 32-cathode-side electrophoresis buffer solution layer 43". High voltage is applied to the capillary array 10 at the cathode side so that the electrode 115 supplies current to GND via the cathode-side buffer solution container 40 and the anode-side buffer solution container 30 for executing electrophoresis.

Figure 4:
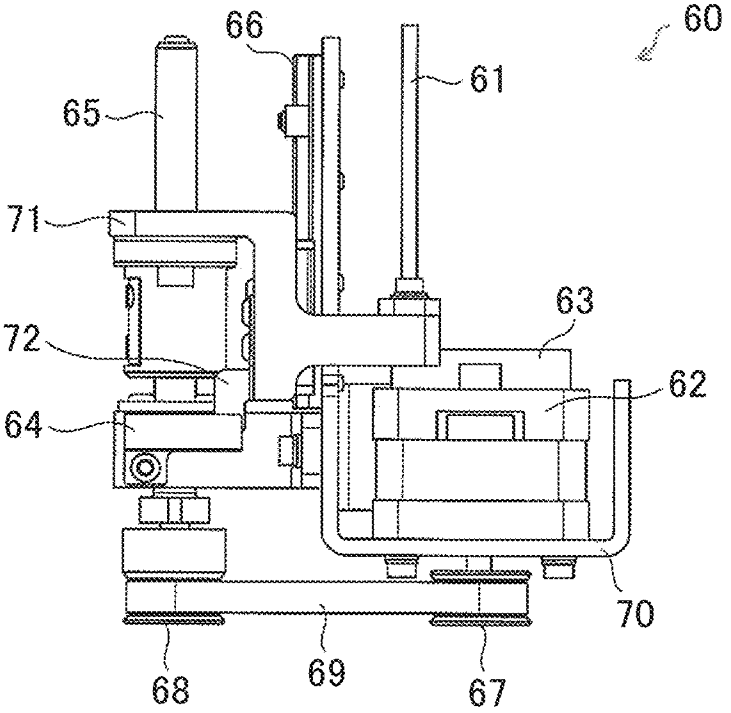
FIG. 4 illustrates a detailed exemplified structure of a delivery mechanism.

FIG. 4 is a detailed view of the delivery mechanism 60. A stepping motor 62 provided with a rotary encoder 63 is mounted on a delivery mechanism base 70. The stepping motor 62 is provided with a drive pulley 67. For example, it is assumed that a two-phase stepping motor is employed as the stepping motor 62, and the rotary encoder 63 is configured to make 400 counts per rotation. A belt 69 links the drive pulley 67 and a driven pulley 68. The driven pulley 68 and a ball screw 65 are fixed. A linear guide 66 is attached to the delivery mechanism base 70 parallel to the ball screw 65. The linear guide 66 and the ball screw 65 are fixed to a slider 71. An origin position is detected by shading an origin sensor 64 using a detection plate 72 attached to the slider 71. The plunger 61 is attached to the slider 71, which is oriented to the same axis direction as that of the drive shaft. Rotation of the stepping motor 62 allows the plunger 61 to be driven.

Figure 5:
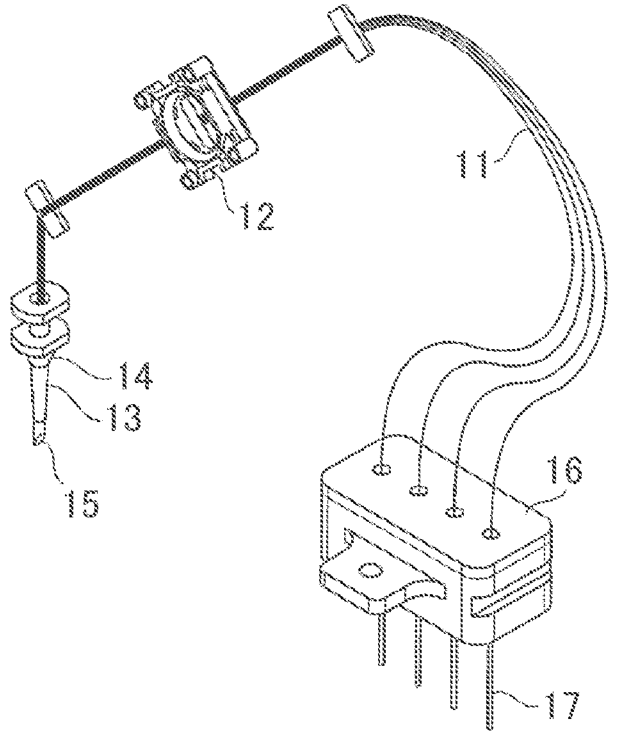
FIG. 5 illustrates a detailed exemplified structure of a capillary array.

FIG. 5 is a detailed view of the capillary array 10. The capillary array 10 includes a capillary 11 as a glass tube with internal diameter of approximately φ50 μm. The capillary 11 is provided with a detection section 12 which is detected by the irradiation detection unit 130. A load header 16 and a SUS pipe 17 are provided at, a cathode end side of the capillary 11. Preferably, the load header 16 is made of a resin with high insulation property and high comparative tracking index, for example, PBT resin and the like. The load header 16 has a component incorporated therein to electrically connect all the SUS pipes 17. High voltage is applied to such component so as to further apply high voltage to all the SUS pipes 17. Each of the capillaries 11 inserted through the SUS pipe 17 and fixed. At the anode side, multiple capillaries 11 are bundled into one in a capillary head 13. The capillary head 13 includes a needle-like acute capillary head tip end 15 and a capillary head boss 14 having its external diameter larger than that of the capillary head tip end 15. Preferably, the capillary head 13 is made of a resin which is hardly chipped, and exhibits rigidity and stability against chemicals and analysis, for example, PEEK resin and the like.

Although not shown, when the capillary array 10 is fixed to the thermostatic bath unit 110, the detect on section 12, the load header 16, and the capillary head 13 are fixed. The detection section 12 is positioned with high accuracy so that it can be detected by the irradiation detection unit. The load header 16 is fixed to be conductive with a part to which high voltage is applied upon fixation. The capillary head 13 is rigidly fixed so that the capillary head tip end 15 directly faces downward to withstand the load. Upon fixation, the components at the cathode side and the anode side are arranged so that multiple capillaries 11 do not overlap with one another when they are set in the device 1.

Exemplary Structure of Phoresis Medium Container

Figure 6:
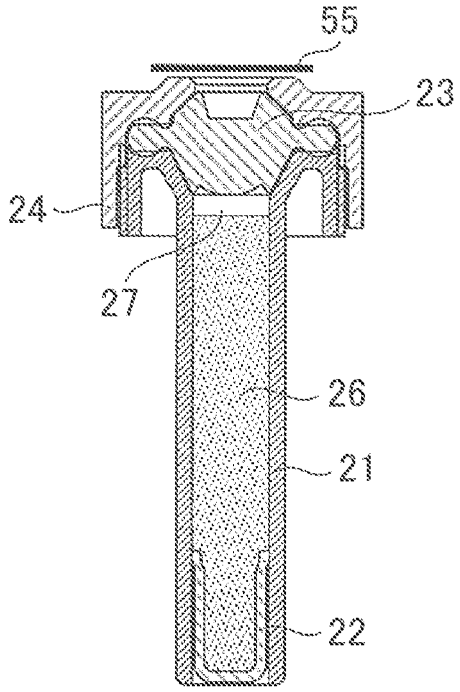
FIG. 6 illustrates a detailed exemplified structure of a phoresis medium container.

FIG. 6 is a detailed view of the phoresis medium container 20. The phoresis medium container 20 has a recess-like seal 22 incorporated in a syringe 21. A rubber plug 23 is placed from above and sealed with a cap 24. A film 55 is further applied onto the cap 24 for sealing. Preferably, the syringe 21 is made of a resin which can be thin-wall molded, for example, PP resin and the like. Preferably, the seal 22 is made of an ultrahigh molecular PE resin or the like with excellent slidability, which is often employed for sealing the fluid around a sliding part. Preferably, the rubber plug 23 is made of a silicone rubber which is stable against the analysis. Preferably, the cap 24 is made of PC resin or the like to be consistent with the film 55 used for the container. A phoresis medium 26 is sealed in the phoresis medium container, and air 27 intruding upon sealing is also sealed to be accumulated in an upper section. The phoresis medium 26 by the volume sufficient to execute 10-RUN analysis is sealed. The seal 22 is made movable inside the syringe 21 through external application of the load.

Setting of Phoresis Medium Container

Figure 7:
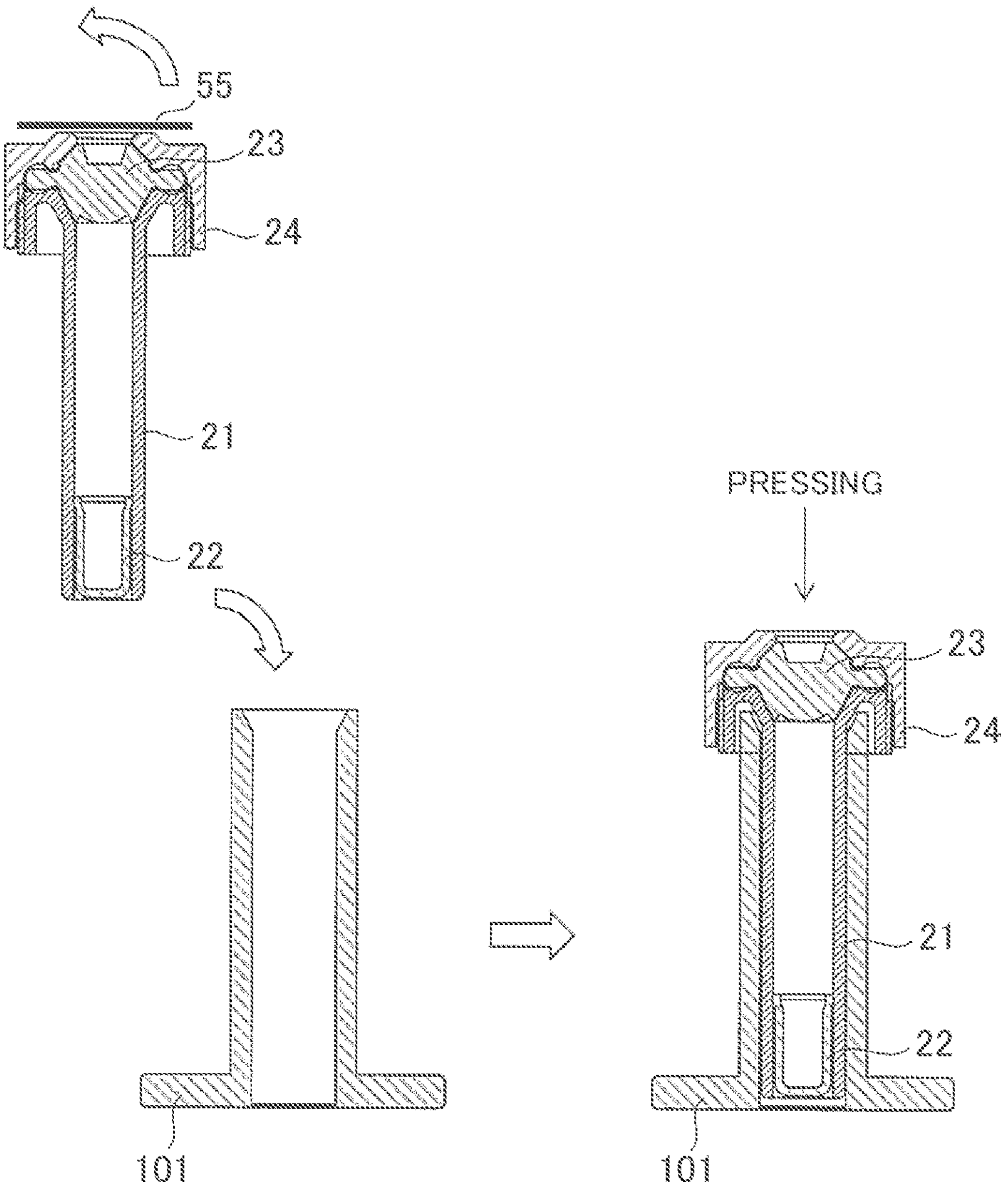
FIG. 7 is an explanatory view indicating a detailed process of setting the phoresis medium container.

FIG. 7 illustrates a detailed process of setting the phoresis medium container 20. When setting the phoresis medium container 20 in the device 1, the film 55 applied to the cap 24 is removed. The phoresis medium container 20 is then inserted into the guide 101 embedded in the sample tray 100, and fixed from above so as not to float up. At this time, the gap between the external diameter of the syringe 21 and the internal diameter of the guide 101 is minimized as small as possible. The gap between the external diameter of the syringe 21 as the resin molded product and the internal diameter of the guide 101 as a machined part may be minimized to such extent as to avoid interference with machining. Specifically, the gap may be set to approximately 0.1 mm.

Connection State between Capillary Array and Phoresis Medium Container

Figure 8:
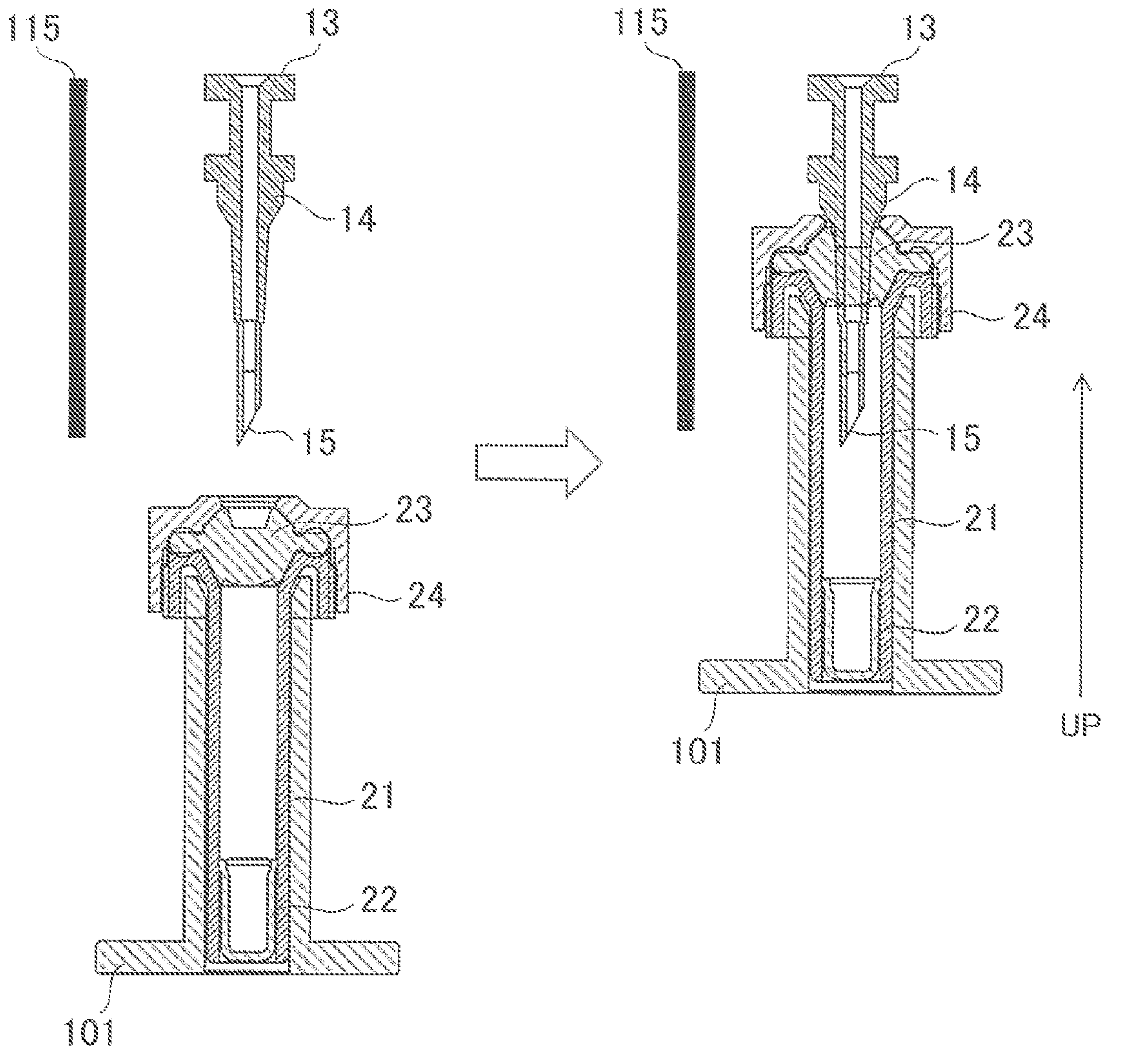
FIG. 8 illustrates a state where the capillary array and the phoresis medium container are connected.

FIG. 8 illustrates a connection state between the capillary array 10 and the phoresis medium container 20. The phoresis medium container 20 set in the sample tray 100 is driven in the Z-axis direction by the autosampler unit 150, and connected to the fixed capillary array 10. The capillary head 13 is allowed to pierce through the rubber plug 23 upon connection. The needle-like capillary head tip end 15 is allowed to pierce through the rubber plug 23. In this case, the electrode 115 is positioned so as not to come in contact with the phoresis medium container 20. The capillary head 13 has the capillary head boss 14 with larger external diameter, which presses the upper surface of the rubber plug 23 from above for connection. The capillary head tip end 15 which has been inserted into the phoresis medium container 20 is positioned lower than the air 27 accumulated in the upper section of the phoresis medium container 20.

In the embodiment, the phoresis medium container 20 is set by removing the film 55. The phoresis medium container 20 can be set by allowing the capillary head 13 to pierce through the film 55 without being removed. This may increase the load to the capillary head 13. However, the use is free from such mistake as forgetting to remove the film 55. This may improve the user' s workability.

Detailed Delivery Operation

Referring to FIGS. 9 to 15, a detailed explanation will be made with respect to a delivery operation of the phoresis medium 26.

Figure 9:
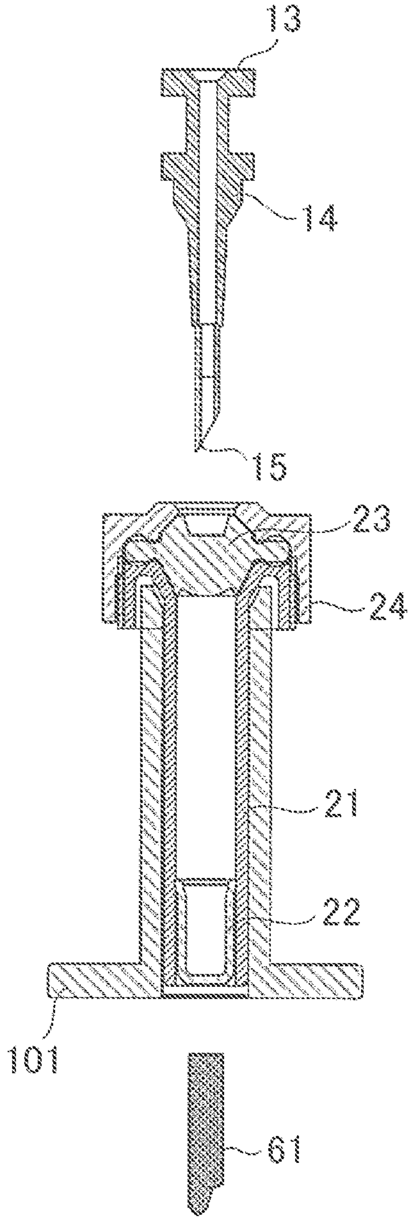
FIG. 9 illustrates a detailed delivery operation of the phoresis medium (initial state).

FIG. 9 illustrates an initial state of a series of operations for injecting the phoresis medium 26. As described above, the phoresis medium container 20 is inserted into the guide 101 embedded in the sample tray 100, and set therein. In this case, the plunger 61 of the delivery mechanism 60 is positioned just below the phoresis medium container 20. The seal 22 in the phoresis medium container 20 is made movable in association with movement of the plunger 61.

Figure 10:
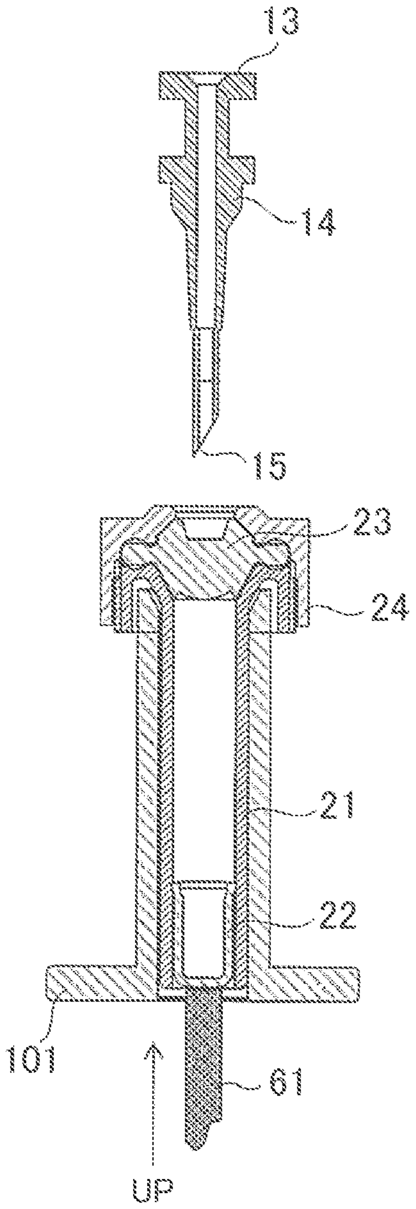
FIG. 10 illustrates a detailed delivery operation of the phoresis medium (detection of contact with plunger).

FIG. 10 illustrates that the contact of the plunger 61 is detected as a part of operations for injecting the phoresis medium 26. Referring to FIG. 9, the plunger 61 of the delivery mechanism 60 is brought into contact with the seal 22 in the phoresis medium container 20 for detecting the contact position. The stepping motor 62 of the delivery mechanism 60 is driven by a weak drive current, and stepped out at a time point when the plunger is in contact with the seal 22. In order to reduce the load to the seal 22, the drive current to the stepping motor 62 is adjusted so that thrust of the plunger 61 becomes approximately 10 N. The rotary encoder 63 detects the step-out of the stepping motor 62 so that the contact of the plunger 61 is detected. Detection of the contact position of the plunger 61 allows accurate acquirement of amount of the phoresis medium 26 in the phoresis medium container 20. The acquired amount can be used for management of the delivery amount and leak detection. After contact of the plunger 61 is detected, the plunger 61 is energized using current higher than the drive current, and kept at the position in contact with the seal 22. Preferably, the current value for energization is set to the one sufficient to hold the thrust corresponding to the pressure to be generated upon delivery of the phoresis medium 26.

Figure 11:
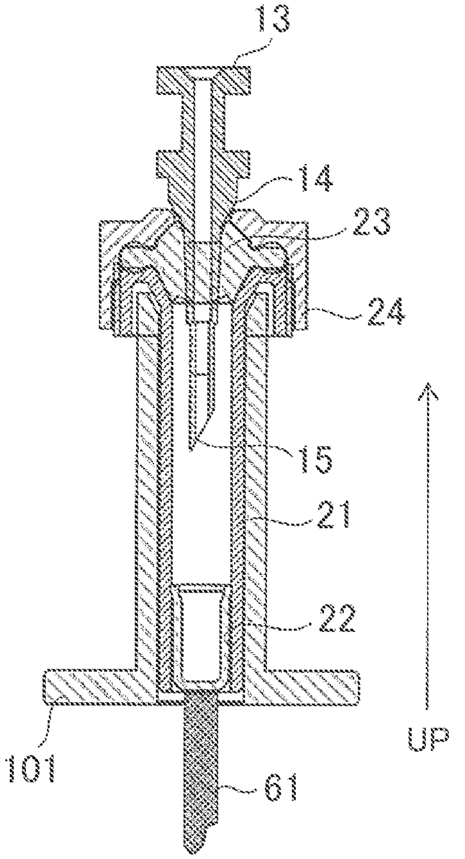
FIG. 11 illustrates a detailed delivery operation of the phoresis medium (connection to capillary).

FIG. 11 illustrates a connection state of the capillary head 13, which is a part of operations for injecting the phoresis medium 26. The Z-axis driver 90 of the autosampler unit 150 is moved to connect the capillary head 13 to the phoresis medium container 20. As described above, the connection is attained by allowing the acute capillary head tip end 15 to pierce through the rubber plug 23 in the phoresis medium container 20. As the plunger 61 of the delivery mechanism 60 is mounted on the Z-axis driver 90 of the autosampler unit 150, the plunger 61 is connected to the seal 22 while being in contact therewith. As described above, the capillary head boss 14 presses the rubber plug 23 from above for connection. The capillary head 13 is inserted into the phoresis medium container 20 while being sealed with the rubber plug 23. This may change the volume in the phoresis medium container 20 to raise the pressure therein. The seal 22 pressed by the plunger 61 is hardly made operable.

Figure 12:
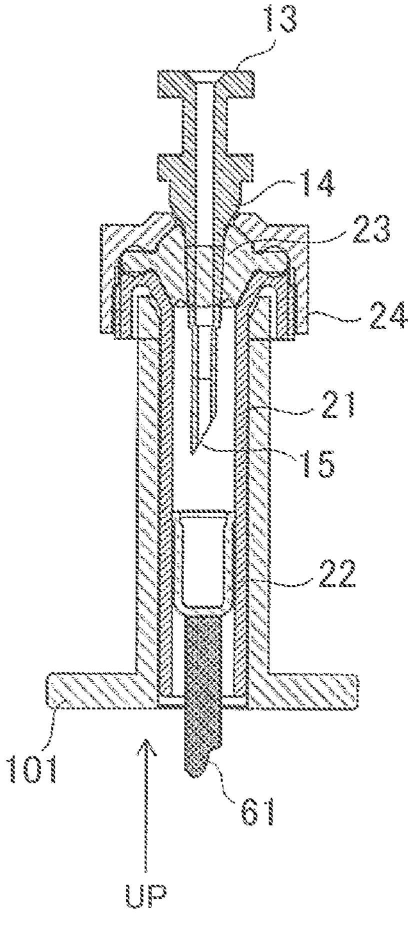
FIG. 12 illustrates a detailed delivery operation of the phoresis medium (injection of phoresis medium).

FIG. 12 illustrates a state where the phoresis medium 26 is injected, which is a part of operations for injecting the phoresis medium 26. After connecting the capillary head 13, the plunger 61 is driven by the delivery mechanism 60 to make the seal 22 operable so that the volume in the phoresis medium container 20 is changed to deliver the phoresis medium. At this time, the resultant high pressure in the phoresis medium container 20 expands the respective components thereof. In this case, the phoresis medium container 20 with low rigidity largely expands to be brought into an instable state. The expansion of the phoresis medium container 20 may significantly influence the sealability of the phoresis medium 26.

The guide 101 serves to suppress expansion of the syringe 21. The capillary head 13 serves to suppress expansion of the rubber plug 23. Expansion of the recess-like seal 22 under the inner pressure enhances the saleability. The seal 22 has its shape or strength more expandable than the syringe 21 so that the influence of expansion of the syringe 21 is lessened. Specifically, the syringe 21 has its thickness set to 1 mm, and the seal 22 has its thickness set to approximately 0.6 mm to make the respective coefficients of expansion different.

In this manner, the influence of expansion on the sealability is lessened. Nevertheless, the expansion amount cannot be eliminated completely. Variation in the expansion amount may influence management of the delivery amount.

The stepping, motor 62 is driven by the drive current sufficient to generate the pressure necessary for delivery so that the plunger 61 is driven. Assuming that the pressure necessary for delivery is set to 3 MPa, the drive current for driving the stepping motor 62 is adjusted so that the thrust of the plunger 61 becomes 75 N for generating the pressure. As a result, the inside of the phoresis medium container 20 expands. At a time point when the inner pressure is raised to the required level, the stepping motor 62 is stepped out. This indicates that the phoresis medium container 20 is fully expanded. The rotary encoder 63 detects the step-out. Even after detecting the step-out, the stepping motor 62 is continuously driven while being stepped out. As the phoresis medium 26 is gradually delivered through the capillary 11, the plunger 61 is gradually driven. After detecting the fully expanded state of the phoresis medium container 20, the driving amount of the plunger 61 is detected by the rotary encoder 63 so that the necessary amount of the phoresis medium 26 is delivered to the capillary 11. Implementation of the foregoing delivery method allows management of the delivery amount without being influenced by expansion of the phoresis medium container 20.

Figure 13:
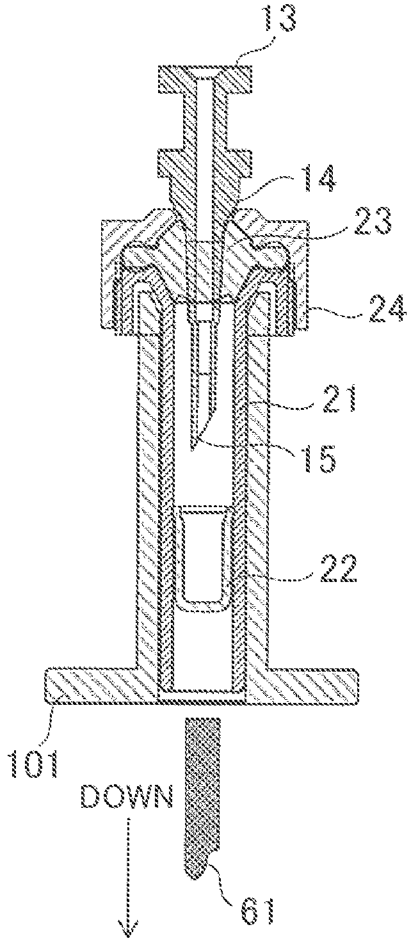
FIG. 13 illustrates a detailed delivery operation of the phoresis medium (release of plunger from connection state).
Figure 14:
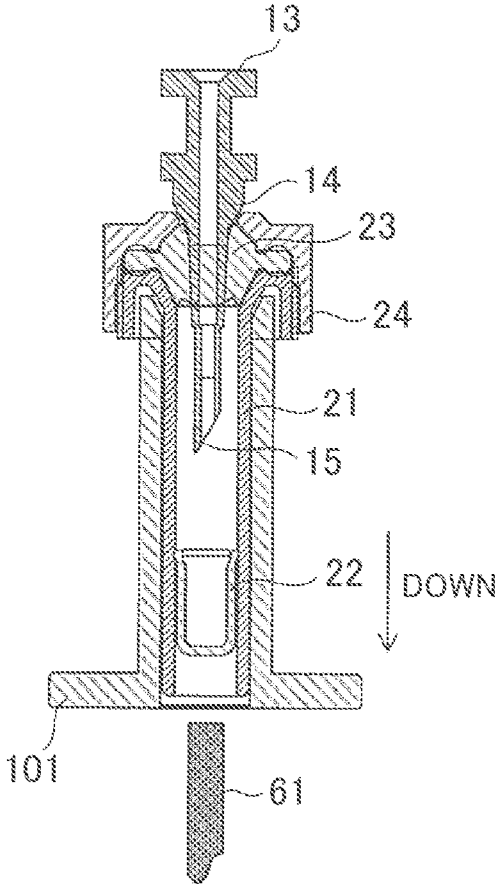
FIG. 14 illustrates a detailed delivery operation of the phoresis medium (removal of residual pressure).

FIGS. 13 and 14 illustrate a detailed process of removing residual pressure in the phoresis medium container 20, which is a part of operations for injecting the phoresis medium 26. After completion of delivery, the plunger 61 of the delivery mechanism 60 is lowered as illustrated in FIG. 12 to separate the plunger 61 from the seal 22. After completion of delivery, the pressure in the phoresis medium container 20 has been kept high. However, as FIG. 13 illustrates the seal 22 is pushed back under the pressure in the phoresis medium container 20 in the foregoing operation so that the residual pressure in the phoresis medium container 20 is removed.

Figure 15:
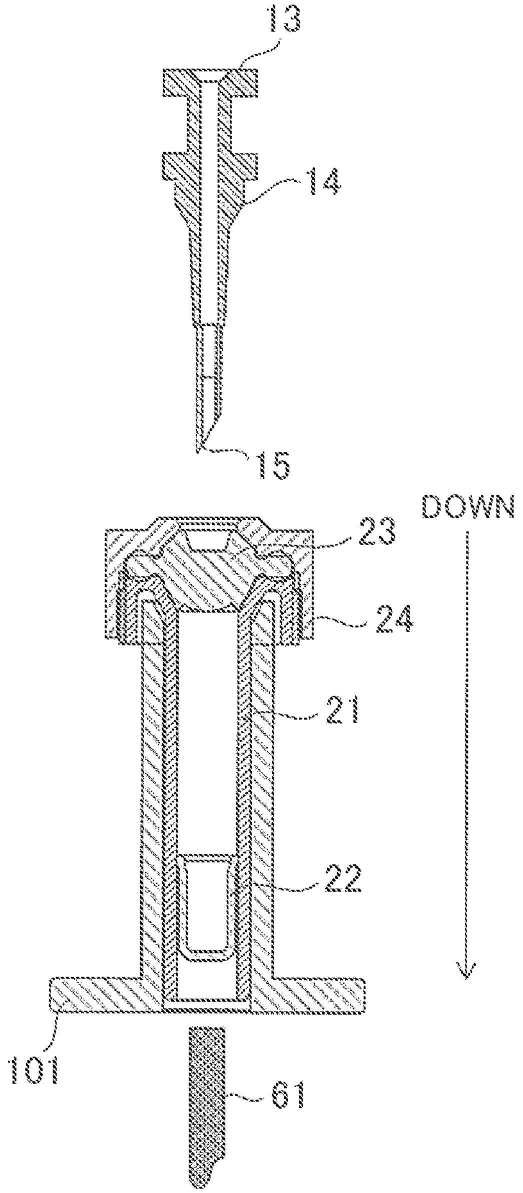
FIG. 15 illustrates a detailed delivery operation of the phoresis medium (release of capillary from connection state).

FIG. 15 illustrates a detailed process of releasing connection state of the capillary head 13, which is a part of operations for injecting the phoresis medium 26. The Z-axis driver 90 of the autosampler unit 150 operated to release the connection between the capillary head 13 and the phoresis medium container 20. At this tire, the residual pressure in the phoresis medium container 20 has been removed in the previous operation. Accordingly, there is almost no concern about scattering of the phoresis medium 26 upon release of connection between the capillary head 13 and the phoresis medium container 20. In the manner as described above, the phoresis medium 26 is delivered to the capillary 11.

Exemplary Inner Structure of Capillary Electrophoresis System

Figure 16:
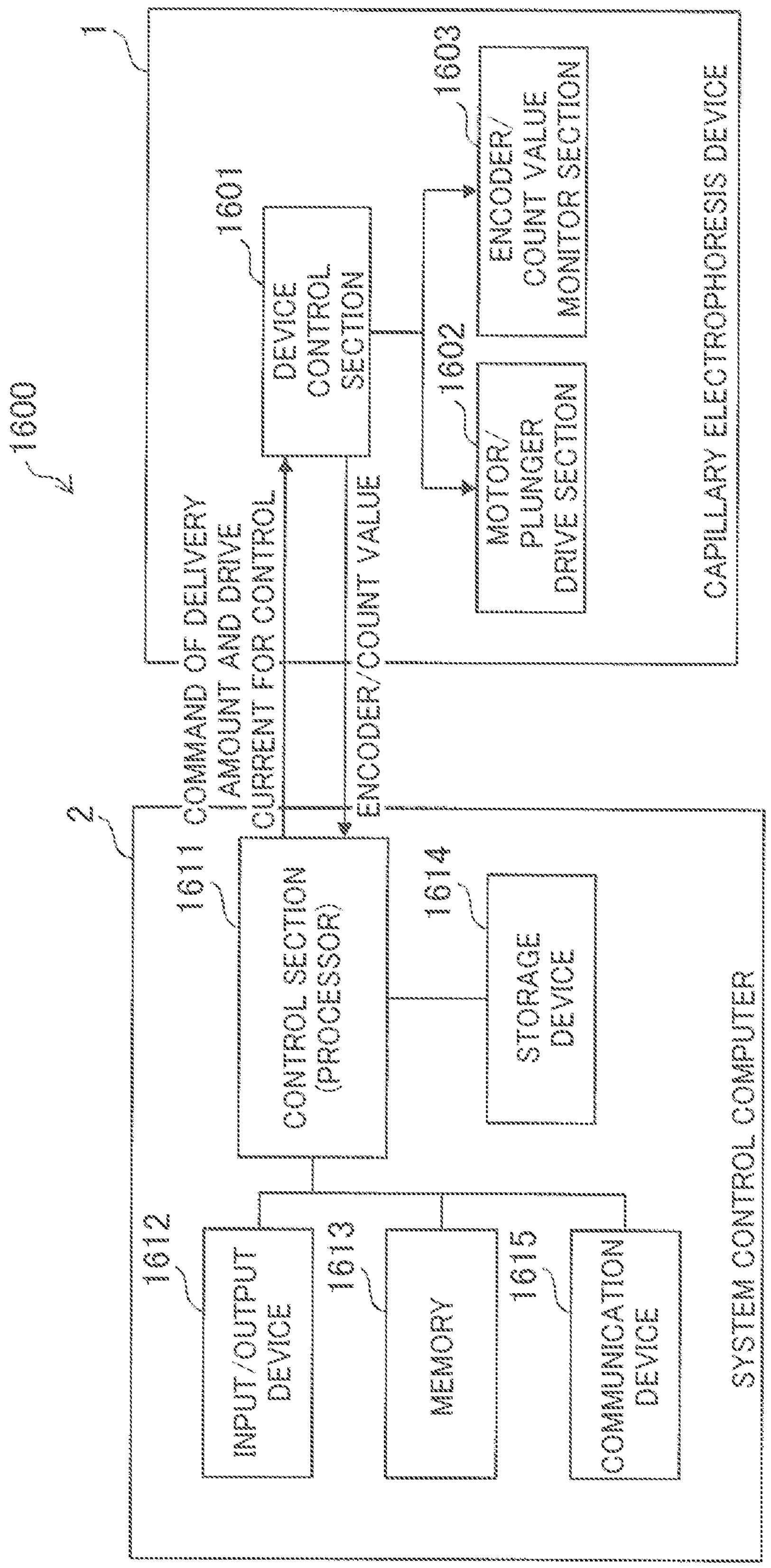
FIG. 16 is a block diagram schematically representing an inner structure of a capillary electrophoresis system 1600 according to the embodiment.

FIG. 16 is a block diagram schematically illustrating an exemplary inner structure of a capillary electrophoresis system 1600 according to an embodiment. The capillary electrophoresjs system 1600 includes the capillary electrophoresis device 1 and the system control computer 2.

Inner structures of the capillary electrophoresis device 1, which are associated with operations include a device control section 1601 for controlling the capillary electrophoresis device 1 as a whole, a motor/plunger drive section 1602 for driving the motor and the plunger 61, and an encoder/count value monitor section 1603 for monitoring the encoder and the count value thereof. The inner structures of the device may include various components other than those described above.

The system control computer 2 includes a control section (for example, processor) 1611, an input/output device 1612, a memory 1613, a storage device 1614, and a communication device 1615. The control section 1611 executes various arithmetic operations relating to the process of controlling delivery correction in accordance with each flowchart (of embodiment) as described later, and generates instruction signals to be transmitted to the capillary electrophoresis device. The input/output device 1612 includes an input section constituted by a keyboard, a mouse, various switches or buttons, which receives commands input by the user, or external signals (via the communication device 1615) to transfer those signals to the control section 1611, and an output section which outputs the processing results (printout and display on screen). The memory 1613 stores various programs, parameters, and data for executing the process steps in accordance with the first to the fourth embodiments to be described later. The storage device 1614 stores data relating to the processing results. The communication device 1615 communicates with the outside or the capillary electrophoresis device 1 to receive commands or transmit the processing results to the outside or to the capillary electrophoresis device 1.

Based on the information (for example, encoder count value) transmitted from the capillary electrophoresis device 1, the control section 1611 of the system control computer 2 executes a process of managing the number of deliveries for management of the number of deliveries of the phoresis medium (counting the number of deliveries), a process of monitoring delivery time, a process of calculating residual amount of phoresis medium, a process of correcting the number of deliveries, a process of calculating delivery amount and dispersion, a process of correcting delivery amount, a process of calculating delivery pressure, and a process of correcting delivery pressure. The control section 1611 transmits control values (instructions), for example, calculated delivery amount, drive current, and the like to the device control section 1601 of the capillary electrophoresis device 1 (via the communication device 1615, for example). In response to the instruction transmitted from the system control computer 2, the device control section 1601 controls the motor/plunger drive section 1602, the encoder/count value monitor section 1603, and the like. Referring to FIG. 16, the system control computer 2 and the device control section 1601 are separate components. However, it is possible to install the device control section 1601 in the system control computer 2, or to allow the control section (processor) 1611 to execute the function of the device control section 1601. That is, the device control section 1601 can be installed in the system control computer 2 (in such a case, the reference number of the device control section will be 1601') by removing the device control section 1601 from FIG. 16, and imparting its function to the control section (processor) 1611. In the foregoing case, the device control section 1601' in the system control computer 2 or the control section 1611 will directly control the motor/plunger drive section 1602 and the encoder/count value monitor section 1603 to acquire the encoder/count value.

Hereinafter, the delivery correction control process will be described in accordance with the first to the fourth embodiments. In the embodiments, the system control computer 2 and the device control section 1601 are separate components as illustrated in FIG. 16. However, the device control section 1601 can be installed in the system control computer 2. In this case, it is assumed that the device control section 1601 may be interpreted as the system control computer 2 or the control section 1611.

Detailed Process of Delivery Correction Control

Generally, the volume of the phoresis medium container 20 can be converted into a count value of the rotary encoder (for example, 4000 counts). The minimum amount of the medium (set value of delivery amount) which has to be delivered to the capillary is preliminarily determined. The system control computer 2 notifies the device control section 1601 of the capillary electrophoresis device 1 of the value as the command amount (for example, 100 counts). In consideration of variations in the device and the phoresis medium container, the capillary electrophoresis device 1 is configured to set (use) the value of a relatively larger delivery amount (estimated delivery amount (worst value): for example, 200 counts). The total amount of the phoresis medium to be stored in the phoresis medium container 20 (4000 counts) is divided by the count value corresponding to the estimated delivery amount to obtain the minimum number of deliveries (estimated number of deliveries). In the case of the generally employed capillary electrophoresis device, upon completion of delivery operated the estimated number of times (minimum number of deliveries: 20 times, for example), the single unit of the phoresis medium container 20 is regarded as being used up. In other words, assuming that the mean value of actual delivery amount for one delivery is 150 counts under the delivery control using the set value of delivery amount (for example, 100 counts), the phoresis medium will never be delivered irrespective of how much the phoresis medium remains in the phoresis medium container. This may waste the expensive phoresis medium, leading to increase in the running cost. Assuming that the mean delivery amount of 150 counts is derived from 130 counts (actual value) for one delivery, and 110 counts (actual value) for another delivery, the delivery amount for delivery operated 20 times results in 3000 counts. This may waste the residual amount corresponding to 1000 counts.

Each process of the respective embodiments relates to the technique for eliminating the waste of the phoresis medium as much as possible so that the expensive phoresis medium can be efficiently used.

EMBODIMENTS

First Embodiment

Figure 17:
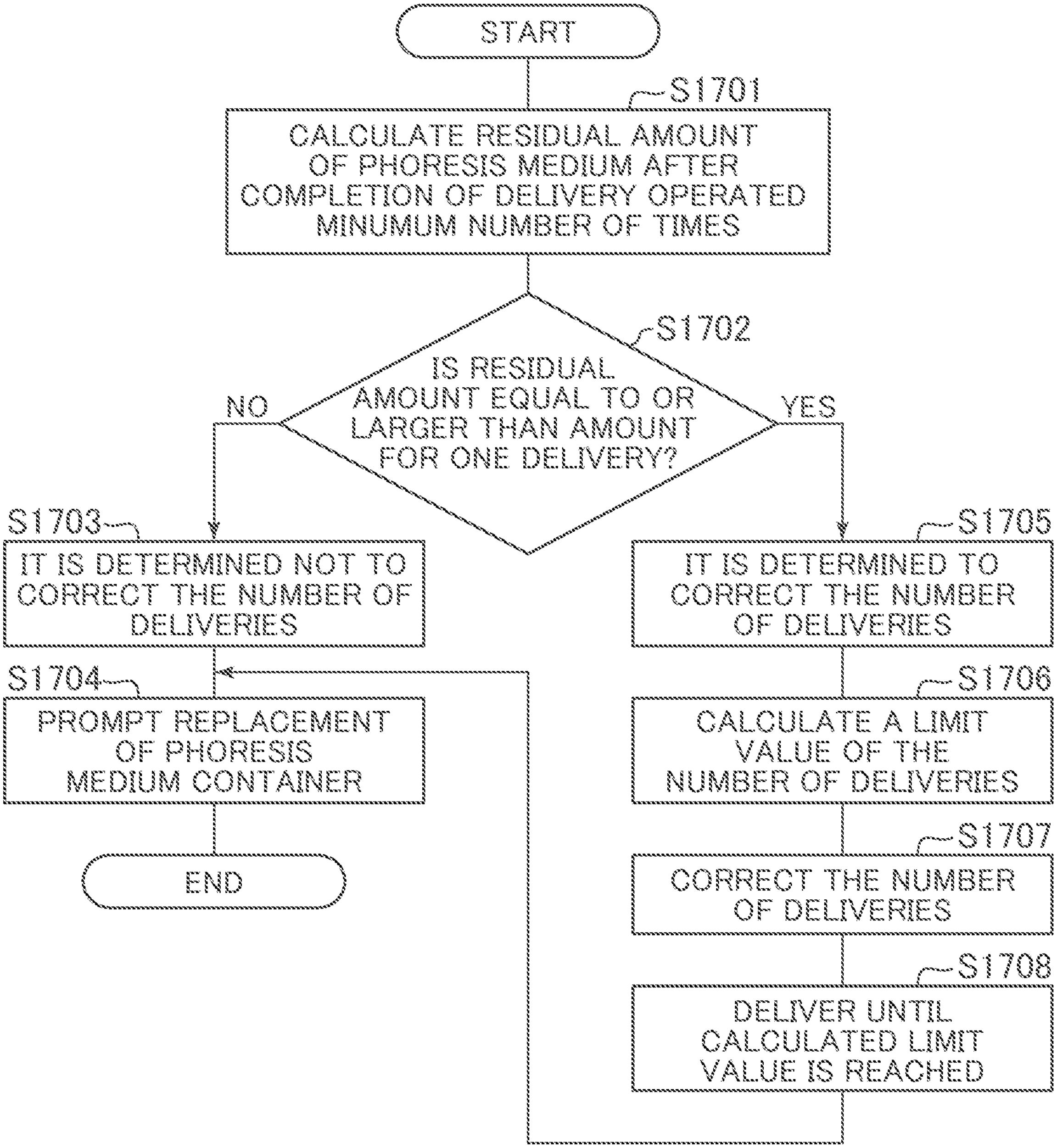
FIG. 17 is a flowchart for explaining the process of correcting the number of deliveries according to first embodiment.

The first embodiment relates to the process of correcting the number of deliveries (calculating the additional number of deliveries) based on the residual amount of phoresis medium, which has been calculated after completion of delivery operated the estimated number of times. The process to be executed in accordance with the flowchart of FIG. 17 will be described. FIG. 17 is the flowchart for explaining the process of correcting the number of deliveries according to the first embodiment. The respective steps wil will be described hereinafter.

(i) step 1701

In response to the user' s (operator' s) command to start delivery, the control section 1611 of the system control computer 2 transmits a delivery start instruction to the capillary electrophoresis device 1. In response to the instruction, the device control section 1601 of the capillary electrophoresis device 1 executes the phoresis medium delivery operation while controlling the motor/plunger drive section 1602 and the encoder/count value monitor section 1603. The device control section 1601 informs the control section 1611 of the actual encoder/count value (indicating the position of the plunger 61) at the end of one delivery operation. Upon execution of one delivery operation, the device control section 1601 controls the motor/plunger drive section 1602 to move the plunger 61 until the encoder/count value becomes the set 77 value of delivery amount (for example, 100 counts). The encoder/count value (set value of delivery amount: for example, 100 counts) for one delivery is preliminarily determined. Due to the structural reason of the plunger 61, the encoder/count value indicating the actual position of the plunger 61 cannot reach the set value (100 counts), resulting in dispersion in the actual delivery amount for the respective deliveries. In other words, even though the encoder/count value indicating the position of the plunger 61 is electrically controlled to be equivalent to the set value of delivery amount, the actual position of the plunger 61 at the end of delivery operation may fail to correspond to the set value of delivery amount.

Upon completion of delivery operated the estimated number of times (minimum number of deliveries: for example, 20 times), the control section 1611 calculates the overall encoder/count value upon completion of delivery operated the estimated number of times (minimum number of deliveries) based on the encoder/count values (actual values) for the respective deliveries notified by the device control section 1601. The control section 1611 subtracts the overall encoder/count value upon completion of delivery operated the estimated number of times (minimum number of deliveries) from the encoder/count value corresponding to the volume of the phoresis medium container 20 (for example, 4000 counts) to obtain the residual amount (count value) of the phoresis medium.

(ii) Step 1702

The control section 1611 determines whether or not the residual amount (count value) calculated in step 1701 is equal to or larger than the estimated delivery amount (worst value) for one delivery. If the residual amount is smaller than the estimated delivery amount (No in step 1702) the process proceeds to step 1705. If the residual amount is equal to or larger than the estimated delivery amount (Yes in step 1702), the process proceeds to step 1705.

(iii) Step 1703

As there may be the case that the residual amount fails to correspond to the set value of delivery amount for one delivery (for example, 100 counts), the control section 1611 determines not to correct the number of deliveries.

(iv) Step 1704

The control section 1611 outputs alarm to replace the phoresis medium container 20 (for example, alarm display). For example, the alarm is displayed on the screen of the display device constituting the input/output device.

(v) Step 1705

As the residual amount is sufficient to attain the set value of delivery amount for one delivery (for example, 100 counts), the control section 1611 determines to correct the number of deliveries.

(vi) Step 1706

The control section 1611 divides the residual amount (count value) calculated in step 1701 by the estimated delivery amount (worst value: for example, 200 counts) to obtain the number of corrections. If the residual amount is 1100 counts, the quotient 5 and remainder 100 are obtained, that is, 1100÷200=5 . . . 100. This indicates that the medium can be delivered at least 5 times.

(vii) Step 1707

The control section 1611 displays the number of deliveries calculated in step 1706 on the display screen to notify the user of the addable number of deliveries (corrected number of deliveries). In response to the delivery start command from the user, the delivery start instruction is transmitted to the device control section 1601.

(viii) Step 1708

Upon completion of delivery operated to the last (the additional number of deliveries derived from correction), the control section 1611 terminates delivery of the phoresis medium stored in the phoresis medium container 20. The process then proceeds to step 1704 to output the alarm for replacement of the phoresis medium container with a new one.

Alternatively, the determination may be made as to further deliverability by calculating the residual amount again after completion of delivery operated the corrected number of times.

Second Embodiment

Figure 18:
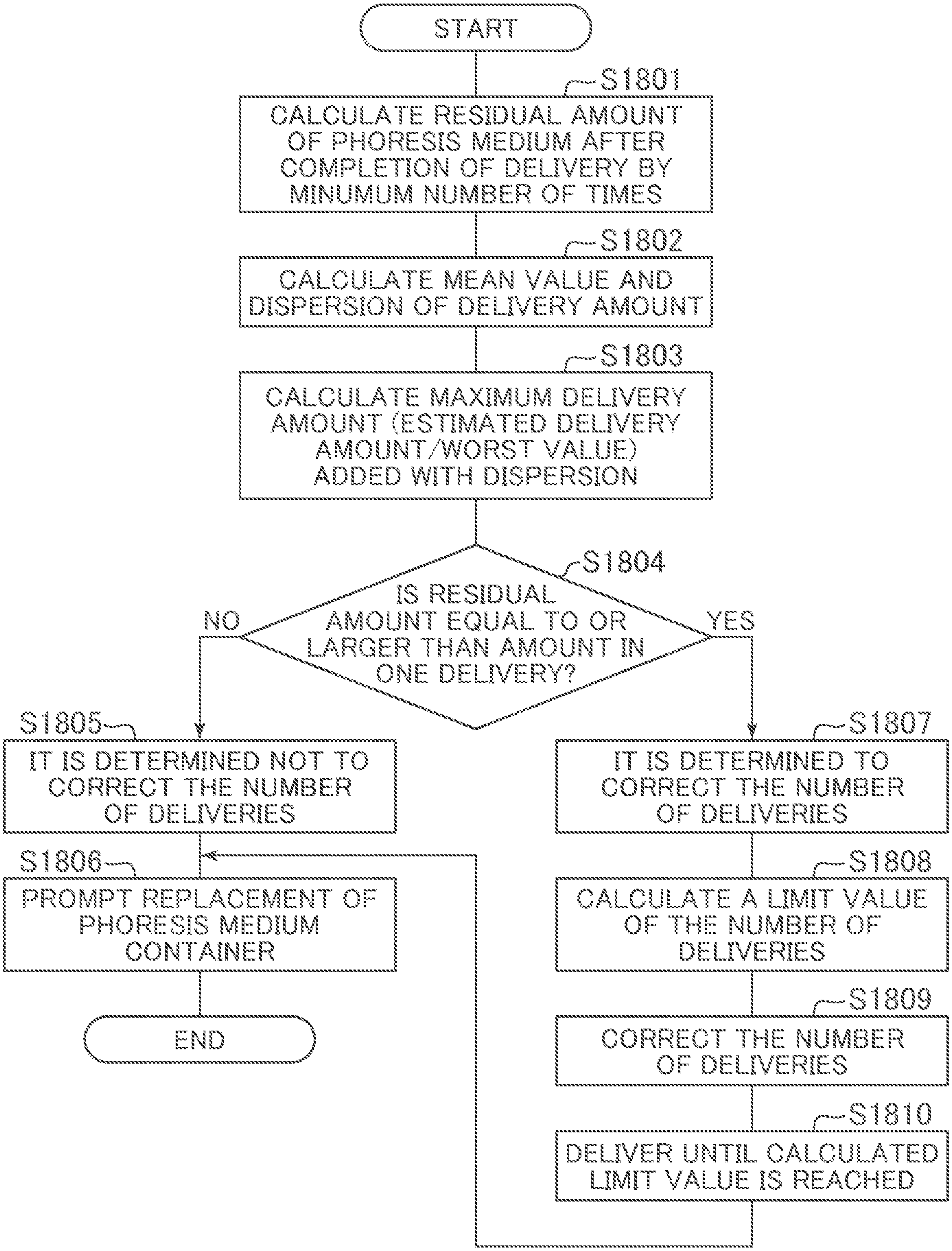
FIG. 18 is a flowchart for explaining the process of correcting the number of deliveries according to a second embodiment.

In the first embodiment, the corrected number of deliveries is derived from the residual amount using the estimated delivery amount (worst value: for example, 200 counts) (fixed value) for delivery operated the minimum number of times. In the second embodiment, the mean value and dispersion (standard deviation) of actual delivery amount are calculated after delivery operated the minimum number of times. The corrected number of deliveries (additional number of deliveries) is derived from The corrected estimation delivery amount (variable worst value) calculated based on the mean value and the dispersion, and the residual amount. FIG. 18 is the flowchart for explaining the process of correcting the number of deliveries according to the second embodiment. The respective steps will be described hereinafter.

(i) Step 1801

Upon completion of delivery operated the estimated number of times (minimum number of deliveries) in accordance with the set value of delivery amount (for example, 100 counts), the control section 1611 calculates the overall encoder/count value upon completion of delivery operated the estimated number of times (minimum number of deliveries) based on the encoder/count value (actual value) for each delivery, which has been notified by the device control section 1601. The control section 1611 subtracts the overall encoder/count value upon completion of delivery operated the estimated number of times (minimum number of deliveries) from the encoder/count value (for example, 4000 counts) corresponding to the volume of the phoresis medium container 20 to obtain the residual amount (count value) of the phoresis medium.

(ii) Step 1802

The control section 1611 calculates the mean value of delivery amount from those for the respective deliveries, based on which the dispersion (for example, standard deviation and variance) is calculated.

(iii) Step 1803

The control section 1611 calculates the corrected estimation delivery amount (variable worst value) in consideration of the dispersion calculated in step 1802 using the equation of, for example, corrected estimation delivery amount=mean value of actual delivery amount+3σ (σ: standard deviation). Assuming that the mean value of actual delivery amount derived from delivery operated the estimated number of times (minimum number of deliveries: for example, 20 times) is 120 counts, and the standard deviation σ is 10 counts, the corrected estimation delivery amount becomes 150 counts. The corrected estimation delivery amount is calculated using the actual value based on the estimated number of deliveries. This makes it possible to acquire the estimated delivery amount (one delivery) consistent with the actual delivery operation in comparison with the fixed estimation delivery amount (one delivery).

(iv) Steps from 1804 to 1810

The process steps from 1804 to 1810 are the same as steps from 1702 to 1708 of FIG. 17, and accordingly, detailed explanations thereof will be omitted. The term "delivery amount for one delivery" or the "estimated delivery amount" used in step 1802 onward will be interpreted as the "corrected estimation delivery amount" calculated in step 1803.

Third Embodiment

The third embodiment relates to the technique of suppressing dispersion in the delivery amount through adjustment of pressing force to the plunger 61 by controlling drive current applied thereto based on the mea sured delivery time using the correlation between the delivery time and the delivery pressure.

(Process of Correcting The Number of Deliveries)

Figure 19:
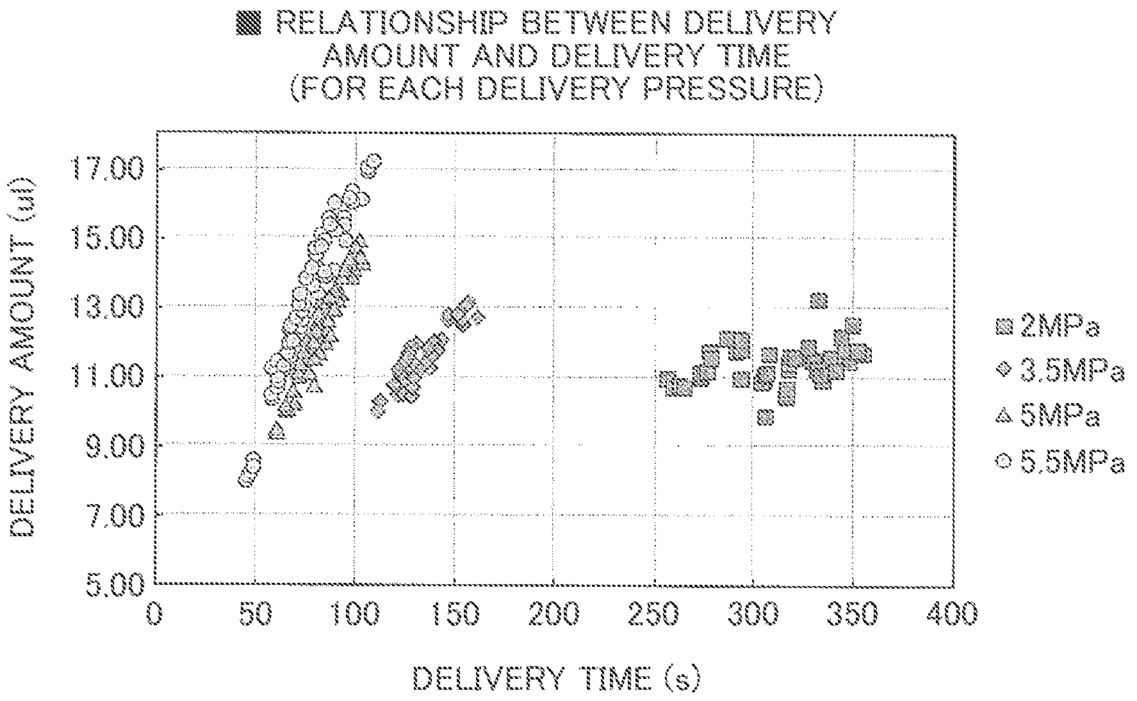
FIG. 19 is a view of a relationship between a delivery amount and a delivery time for each delivery pressure.
Figure 20:
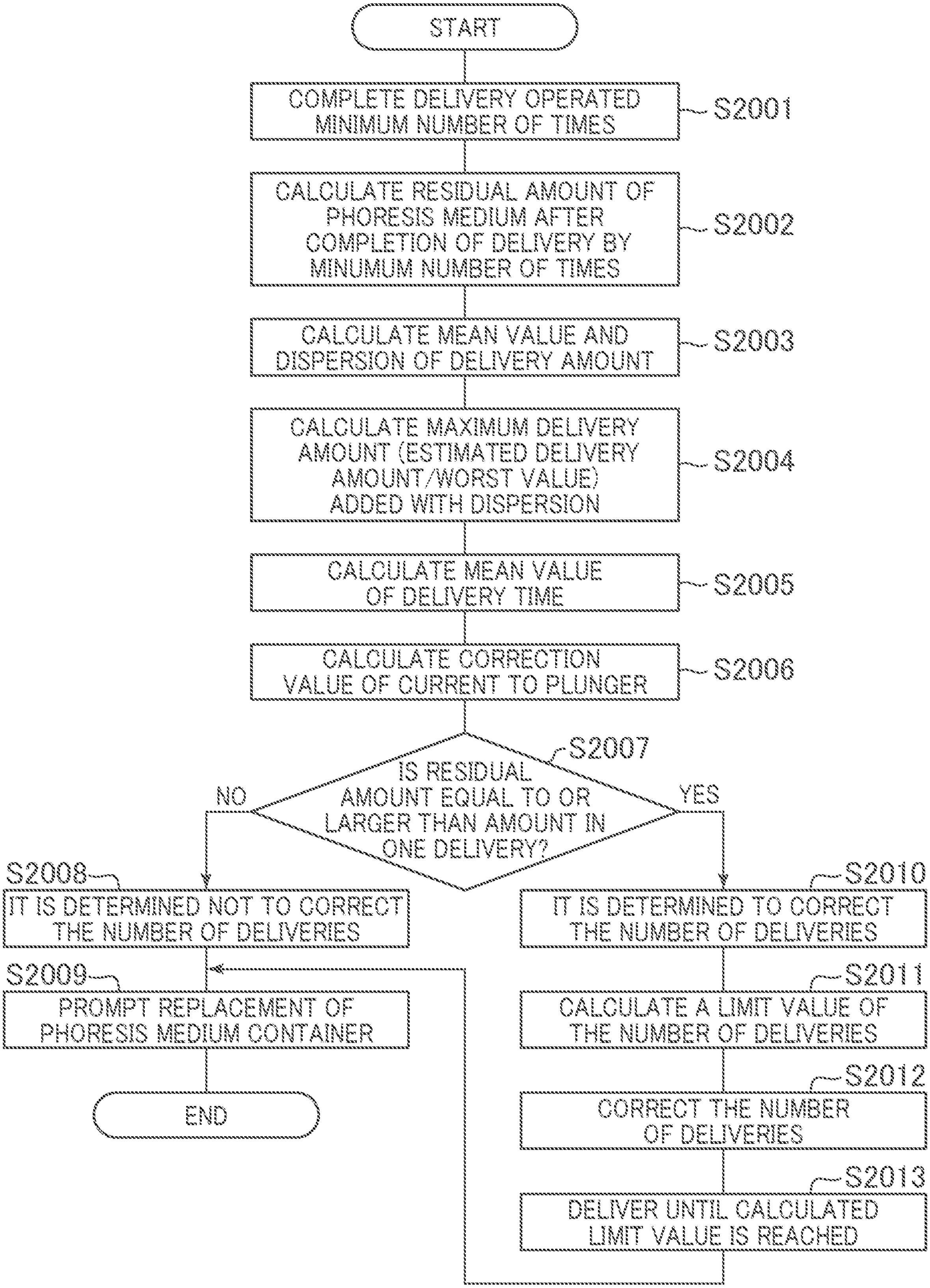
FIG. 20 is a flowchart for explaining the process of correcting the number of deliveries according to a third embodiment (calculation of corrected current value to plunger 61+calculation of the corrected number of deliveries).

FIG. 19 represents a relationship between the delivery amount and the delivery time at each delivery pressure. Referring to FIG. 19, in the case of low delivery pressure (pressure applied to the plunger 61) (for example, 2 MPa), dispersion in the delivery amount is small. However, the delivery time becomes longer, and the dispersion in the delivery time becomes larger as well. In the case of high delivery pressure (for example, 5 MPa or 5.5 MPa), the dispersion in the del very time becomes small but the dispersion in the delivery amount becomes large. Accordingly, the delivery pressure is adjusted to be more appropriate (for example, 3.5 MPa (relatively appropriate)) to bring each dispersion in the delivery time and the delivery amount into appropriate range. Then the drive current for driving the plunger 61 is controlled so that the delivery operation can be executed at more appropriate delivery pressure. FIG. 20 is the flowchart for explaining the process of correcting the number of deliveries according to the third embodiment (calculation of corrected current value to the plunger 61+calculation of the corrected number of deliveries).

(i) Step 2001

The control section 1611 completes the delivery operated the estimated number of times (minimum number of deliveries: for example, 20 times) in accordance with the set value of delivery amount (for example, 100 counts). The control section 1611 measures the time taken for operating each delivery.

(ii) Steps from 2002 to 2004

The process steps from 2002 to 2004 are the same as steps from 1801 to step 1803 of FIG. 18, and accordingly, detailed explanations thereof will be omitted.

(Iji) Step 2005

The control section 1611 calculates the mean value of delivery time measured for each delivery.

(iv) Step 2006

The control section 1611 estimates the delivery pressure from the mean delivery time calculated in step 2002, and calculates a correction value of the drive current to the plunger 61 so that the delivery time is brought into a predetermined threshold range. The process of calculating the correction value of the drive current will be described in detail.

Figure 21:
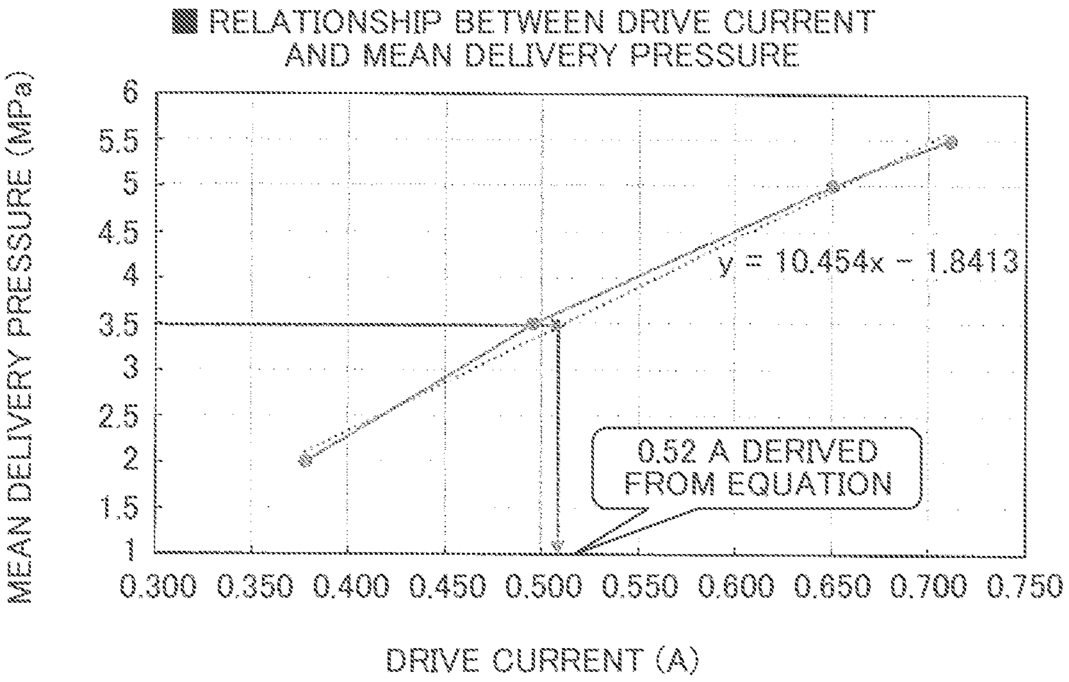
FIG. 21 is a view of a relationship between a drive current and a mean delivery pressure (correlation: for example, proportional relationship).

As FIG. 21 indicates, it has been known that the drive current and the mean delivery pressure are correlated (for example, proportional relationship). As FIG. 22 indicates, it has been known that the mean delivery pressure and The delivery time are correlated. The system control computer 2 stores tables or information on the correlation line and the correlation curve corresponding to FIGS. 21 and 22, respectively in the memory 1613 or the storage device 1614 so that The stored data are referred when calculating the correction value of the drive current.

Figure 22:
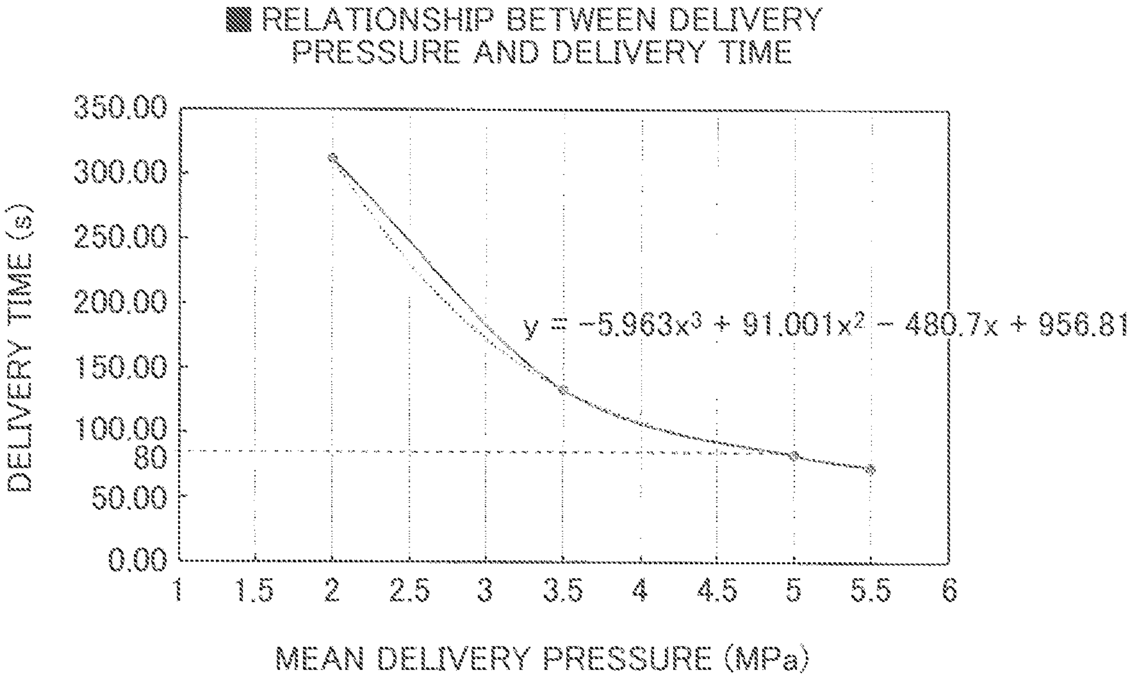
FIG. 22 is a view of a relationship (correlation) between the mean delivery pressure and a delivery time.

Specifically, the control section 1612 refers to FIG. 22 (applies the mean delivery time to the approximate curve) to estimate the delivery pressure value from the mean delivery time calculated in step 2002. It is assumed that the mean delivery time is 80 s as a result of delivery operation under the conditions that the drive current value to the plunger 61 is set to 0.5 A so that the pressure to the plunger 61 becomes 3.5 MPa. In the above-described case, the estimated delivery pressure is approximately 5 MPa with reference to FIG. 22 (it is possible to obtain the mean delivery pressure (x) by applying the mean delivery time (y) 80 s to the approximate curve, that is, $y=-5.963x^3+91.001x^2-480.7x+956.81$). Contrary to the actually estimated delivery pressure value (3.5 MPa), the estimation result indicates that the delivery pressure fluctuates to become 5 MPa at the set drive current value of 0.5 A. It is clarified that the drive current value set to 0.5 A is too high (consequently, the delivery pressure becomes too high).

Figure 23:
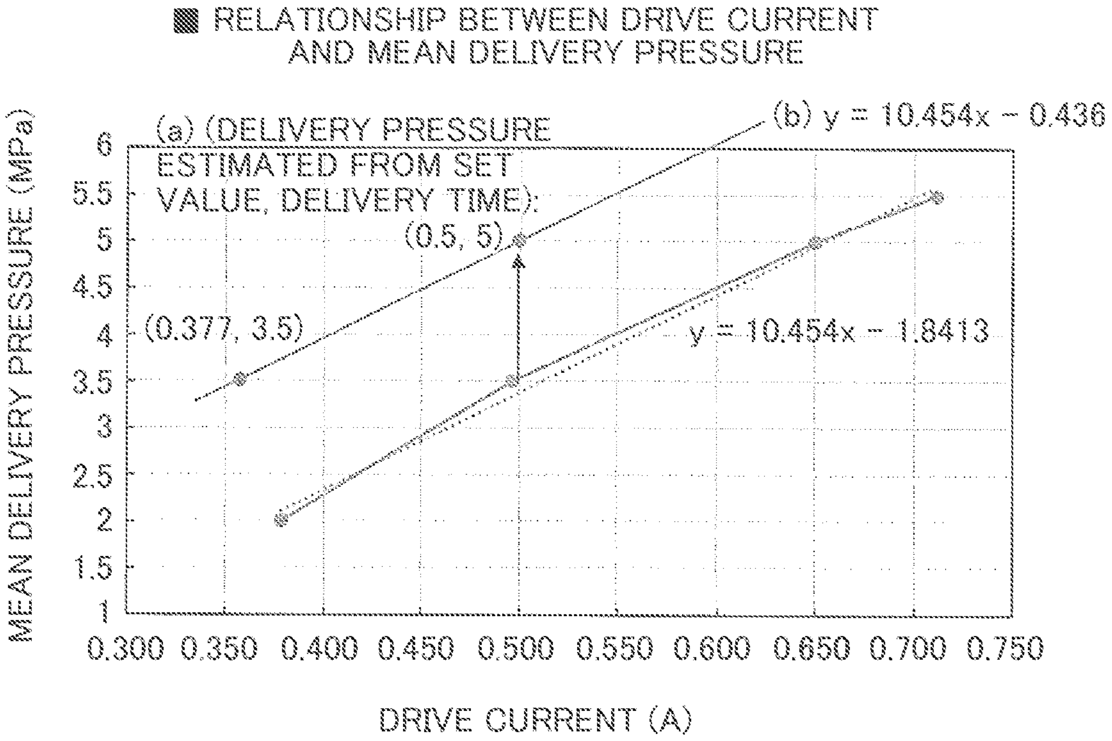
FIG. 23 is a view of a relationship between the corrected drive current and the mean delivery pressure.

The relational equation between the drive current and the mean delivery pressure (FIG. 21: $y=10.454x-1.8413$) is corrected. As the drive current and the delivery pressure are proportionally related, inclination is kept unchanged irrespective of dispersion. The piece (−1.8413) of the equation shown in FIG. 21 as corrected using the set value of 0.52 A and the estimated delivery pressure. In other words, the piece is derived from the equation, that is, piece=y−10.454x=5−10.454X 0.52=−0.227. Accordingly, the relationship between the drive current and the mean delivery pressure after correction (correction relational equation) is expressed as $y=-10.454x-0.436$. In accordance with the correction relational equation (FIG. 23 shows the relationship between The drive current and the mean delivery pressure, which have been corrected), the current value which attains the delivery pressure of 3.5 MPa is derived from the equation of 3.5=10.454x−0.436, that is, x=0.356514253=0.377[A]. Accordingly, the delivery pressure can be controlled appropriately by changing the set current value to 0.377 A. When executing the delivery operation using the corrected current value, the delivery time for one delivery is controlled to be brought into the predetermined threshold range (for example, from 100 s to 150 s).

The control section 1611 is capable of estimating the dispersion in the delivery amount from, the relationship between the delivery amount and the delivery time at each delivery pressure (FIG. 19). Based on the dispersion in the delivery amount, the set value of the delivery amount and the estimated delivery amount can be newly calculated (correcting the set value of delivery amount and the estimated delivery amount). The control section 1611 is capable of commanding the device control section 1601 to deliver the remaining medium (additional delivery) using the set value of delivery amount and the estimated delivery amount, which have been corrected.

(v) Steps from 2007 to 2013

The process steps from 2002 to 2004 are the same as steps from 1804 to 1810 of FIG. 18 (steps from 1702 to 1708 of FIG. 17), and accordingly, detailed explanations thereof will be omitted. In the case of delivery operated the calculated corrected number of times, the control section 1611 sets the drive current applied to the plunger 61 to the corrected current value (for example, 0.377 A as described above).

(Other Example: Modification)

(i) In the process steps as shown in FIG. 20, the estimated delivery amount considering dispersion (corrected estimation delivery amount: correction from 200 counts to 125 counts) is calculated to obtain the additional number of deliveries (corrected number of deliveries) (corresponding to the second embodiment). It is also possible to obtain the corrected number of deliveries (additional number of deliveries) using the fixed estimated delivery amount without considering dispersion for executing the delivery operated the obtained corrected number of times (corresponding to the first embodiment).

(ii) The process of calculating the corrected current value to the plunger 61 (steps 2005 and 2006) is applicable by itself to the control of the capillary electrophoresis device 1 without being combined with the process of correcting the number of deliveries. In steps 2001 and 2002 of FIG. 20, the corrected current value is calculated after completion of delivery operated the minimum number of times (for example, 20 times). Upon execution of the process of calculating the corrected drive current value to the plunger 61 independently, the steps 2005 and 2006 can be executed before the number of deliveries reaches the minimum number of times (even if the number of deliveries cannot reach 20 times). This allows the plunger 61 of the capillary electrophoresis device 1 to be operated in accordance with the appropriate current value, resulting in suppression of dispersion in the delivery amount

Fourth Embodiment

The fourth embodiment relates to the technique of calculating the number of corrections (additional number of deliveries) in the following manner. The mean value of the actual delivery amount is calculated based on a positional transition of the plunger 61. The set value of delivery amount is automatically adjusted, and the estimated delivery amount (worst value) is replaced with the mean value of actual delivery amount (corrected estimation delivery amount). The residual amount of phoresis medium is divided by the corrected estimation delivery amount for calculating the number of corrections.

(Process of Correcting the Number of Deliveries)

Figure 24:
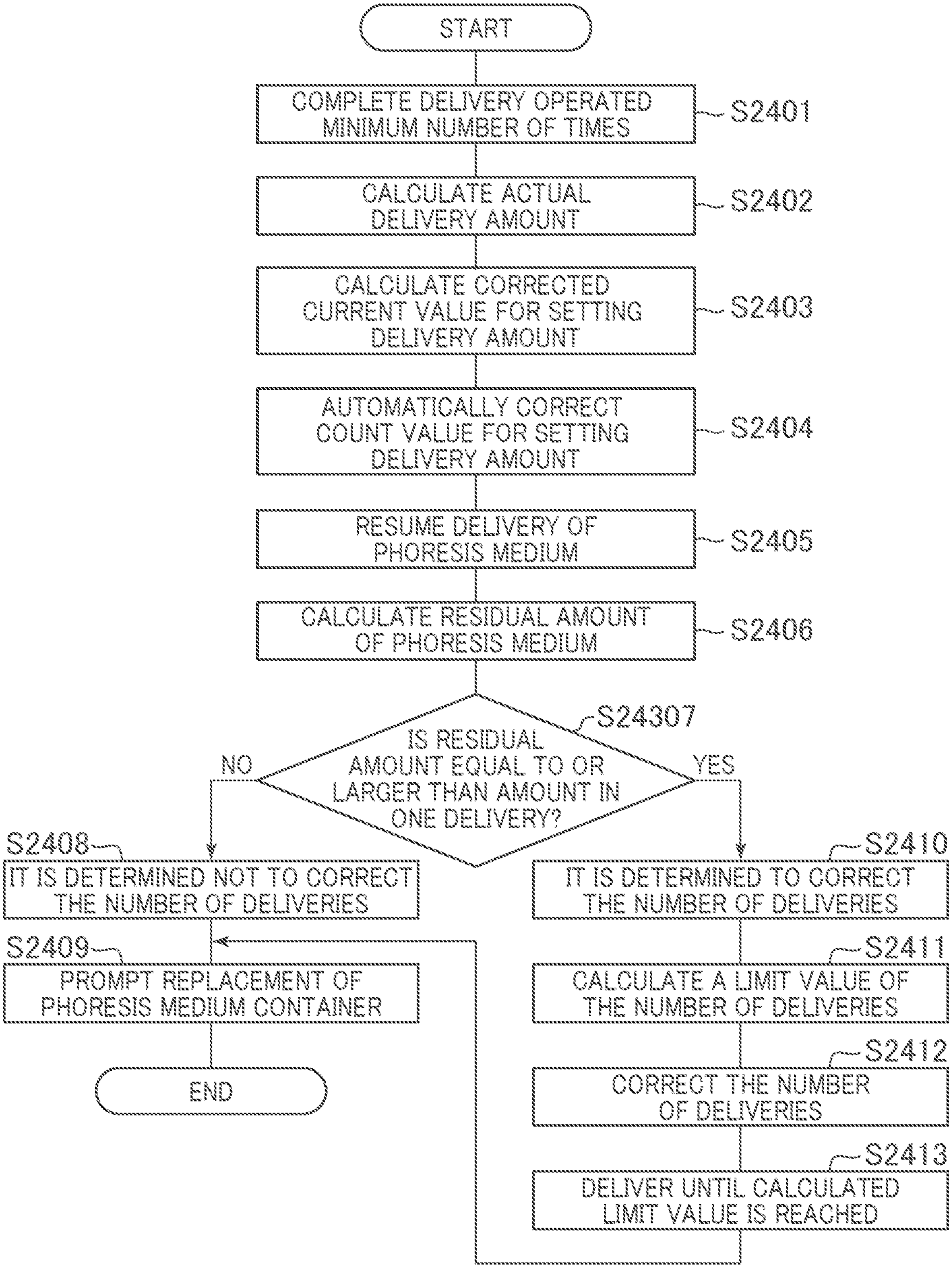
FIG. 24 is a flowchart for explaining the process of correcting the number of deliveries according to a fourth embodiment (calculation of an off-set value+calculation of the corrected number of deliveries).

FIG. 24 is a flowchart for explaining the process of correcting the number of deliveries (calculation of offset value+calculation of corrected number of deliveries) according to the fourth embodiment. The respective steps will be explained.

(i) Step 2401

The control section 1611 executes delivery operated the estimated number of times (minimum number of deliveries: for example, 20 times) in accordance with the set value of delivery amount (for example, 100 counts). It is also possible for the control section 1611 to measure the time taken for each delivery operation (ii) Step 2402

Upon completion of delivery operated the estimated number of times (minimum number of deliveries: for example, 20 times), the control section 1611 calculates the overall encoder/count value upon completion of delivery (for example, completion of delivery operated 20 times) based on the encoder/count value (actual value) for each delivery, which has been notified by the device control section 1601. The control section 1611 calculates the mean value of delivery amount from the total delivery amount.

(iii) Step 2403

The control section 1611 compares the mean value of delivery amount calculated in step 2402 (for example, 160 counts) with the set value of delivery amount (for example, 100 counts) to obtain an offset value of delivery amount (mean value−set value=160−100=60 counts).

(iv) Step 2404

The control section 1611 corrects (adjusts) the set value of delivery amount (corrected set value of delivery amount) by subtracting the offset value obtained in step 2403 from the initial value (for example, 100 counts) of the set value of delivery amount, and resets the fixed estimated delivery amount to the mean value of actual delivery amount (for example, 160 counts as described above). The corrected set value of delivery amount is required to be equal to or larger than the necessary delivery amount as minimum possible value to be secured. If the calculated set value is smaller than the necessary delivery amount, the offset value may be adjusted to attain the necessary delivery amount.

(v) Steps 2405 and 2406

The control section 1611 transmits the command for resuming delivery of the phoresis medium to the device control section 1601 of the capillary electrophoresis device 1, and calculates the residual amount (count value) of the phoresis medium by subtracting the overall encoder/count value upon completion of delivery operated the estimated number of times (minimum number of deliveries) from the encoder/count value corresponding to the volume of the phoresis medium container 20 (for example, 4000 counts)

(vi) Steps from 2407 to 2413

The steps from 2407 to 2413 are the same as steps from 1702 to 1708 of FIG. 17, and accordingly, explanations thereof will be omitted.

(Other Example: Modification)

(i) The foregoing process is configured to calculate the number of corrections (additional number of deliveries) corresponding to the first embodiment. It is possible to obtain dispersion in the actual delivery amount so that the number of corrections (additional number of deliveries) is obtained based on the corrected estimation delivery amount considering the dispersion corresponding to the second embodiment.

It is also possible to add the process steps according to the third embodiment to those of the fourth embodiment. In this case, as described in the third embodiment, the delivery pressure is estimated from the mean delivery time for delivery operated the estimated number of times (for example, 20 times), based on which the correction value of the drive current to the plunger 61 (corrected drive current value) is calculated. Upon operation of the additional delivery, the plunger 61 is driven in accordance with the corrected drive current value which has been calculated.

(ii) The process of automatically adjusting the above-described set value of delivery amount (steps from 2401 to 2405) is applicable by itself to the control of the capillary electrophoresis device 1 without being combined with the process of correcting the number of deliveries. Referring to FIG. 24, the process of adjusting the set value of delivery amount is executed after completion (step 2401) of delivery operated the minimum number of times (for example, 20 times). If the process is to be executed independently, the process steps from 2402 to 2405 can be executed before the number of deliveries reaches the minimum number of times (in other words, even if the number of deliveries cannot reach 20 times). That is, the process of adjusting the set value of delivery amount can be executed by interpreting the "minimum number of deliveries" in step 2401 as the "predetermined number of times (less than the minimum number of deliveries)". It is also possible to use the set value of delivery amount, which has been adjusted by the delivery operation of the phoresis medium from the new phoresis medium container which has replaced the previously used phoresis medium container. This makes it possible to appropriately set the delivery amount for one delivery (which is not excessively large nor small), and suppress dispersion in the delivery amount.

SUMMARY (i) The first embodiment relates to the process of correcting the number of deliveries (calculation of additional number of deliveries) based on the calculated residual amount of the phoresis medium after completion of delivery operated the estimated number of times. That is, the first embodiment provides the capillary electrophoresis system (measurement system: hereinafter referred to as "system") configured to calculate the deliverable number of times from the amount of phoresis medium in the phoresis medium container and the estimated delivery amount of the phoresis medium delivered by the delivery mechanism. The above-configured system allows the efficient use of the phoresis medium stored in the phoresis medium container to lower the running cost.

For example, the estimated delivery amount of the phoresis medium indicates that it is determined in consideration of dispersion in the delivery amount based on the phoresis device and/or phoresis medium container. Based on the residual amount of phoresis medium after completion of delivery operated the predetermined number of times (for example, minimum number of deliveries: 20 times), and the estimated delivery amount, the system calculates the deliverable number of times indicating additional deliverable number of times, and commands the electrophoresis device to execute delivery to be operated the deliverable number of times. The deliverable number of times can be calculated when the residual amount of phoresis medium is larger than the estimated delivery amount. This makes it possible to use up the phoresis medium in the phoresis medium container by minimizing the residual amount.

(ii) In the second embodiment, the mean value and dispersion (standard deviation) of actual delivery amount after the delivery operated the minimum number of times are calculated. The corrected number of deliveries (additional number of deliveries) is calculated from the corrected estimation delivery amount (variable worst value) derived from the calculated values), and the residual amount. This makes it possible to accurately obtain the additional deliverable number of times (corrected number of deliveries), resulting in further efficient use of phoresis medium.

(iii) In the third embodiment, the drive current to the plunger 61 is controlled based on the delivery time measured from the correlation between the delivery time and the delivery pressure to adjust the pressing force to the plunger 61 so that dispersion in the delivery amount is suppressed. That is, the system measures the time taken for filling the capillary with The phoresis medium, and detects change in the delivery pressure based on the filling time, and the relationship between the filling time and the delivery pressure (FIG. 22) so that the delivery pressure is changed. More specifically, the system changes the drive current to the plunger of the delivery mechanism to change the delivery pressure. This makes it possible to appropriately adjust the pressing force to the plunger 61, especially, to suppress dispersion in the delivery amount in the case of the delivery time shorter than the predetermined delivery time (deviating from the predetermined threshold range of the delivery time). The capillary electrophoresis device 1 is controlled to make the delivery operated the deliverable number of times executable at the changed delivery pressure. This makes it possible to execute the stable delivery to the capillary (stabilizing delivery amount).

Based on the changed delivery pressure, the system corrects the set value of delivery amount as the target delivery amount for delivery control, and the estimated delivery amount. This makes it possible to appropriately obtain the corrected number of deliveries (additional number of deliveries) as described above.

Primary technical ideas of the third embodiment relate to the process of changing the delivery pressure by adjusting the drive current to the plunger 61 rather than correction of the number of deliveries (calculation of additi onal number of deliveries from the residual amount). It should be understood that the technique of the third embodiment (process of changing delivery pressure) is applicable to the first or the second embodiment.

(iv) According to the fourth embodiment, the mean value of actual delivery amount is calculated based on the positional transition of the plunger 61 to automatically adjust the set value of delivery amount, and to replace the estimated deli very amount (worst value) with the mean value of actual delivery amount (corrected estimation deli very amount). The residual amount of the phoresis medium is divided by the corrected estimation delivery amount to calculate the corrected number of times (additional number of deliveries). That is, based on the actual delivery amount, the system calculates the offset value to the set value of delivery amount as the target delivery amount for delivery control to correct the set value of delivery amount. In accordance with the corrected delivery amount, the electrophoresis device is controlled to execute the delivery operation. This makes it possible to deliver the phoresis medium in accordance with the deli very control value adaptively to the actual delivery state, and to use the phoresis medium further efficiently. The system calculates the mean delivery amount of those delivered the predetermined number of times from the actual delivery amount The mean delivery amount is set to the estimated delivery amount to control the delivery operation of the phoresis medium.

Primary technical ideas of the fourth embodiment relate to the process of correcting the set value of delivery amount rather than correction of the number of deliveries (calculation of additional number of deliveries from the residual amount). It should be understood that the technique of the fourth embodiment (process of changing delivery pressure) is applicable to the first or the second embodiment.

v) Functions of the respective embodiments can be implemented by program, codes of software. In this case, the computer (or CPU, MPU) of the system or the device will read the program codes stored in the storage medium. The program codes read from the storage medium serve to implement functions of the embodiments. The program codes by themselves, and the storage medium for storing them constitute the disclosure. A flexible disk, a CD-ROM, a DVD)-ROM, a hard an optical disk, a magnetooptical disk, a CD-R, a magnetic tape, a nonvolatile memory card, a ROM and the like may be employed as the storage medium for supplying the program codes.

The functions of the embodiments may be implemented by the OS (operating system) running on the computer which partially or fully executes the actual processing based on commands of the program codes. The functions of the embodiments may also be implemented by the CPU of computer which partially or fully executes the actual processing based on the command of the program codes that have been read from the storage medium, and then written in the memory of the computer.

The program codes of software for implementing functions of the embodiments are distributed via the network so as to be stored in the storage means such as hard disk and memory, or storage medium such as CD-RW, CD-R of the system or the device. The computer (or CPU, MPU) of the system or the device, which reads the program codes stored in the storage means and the storage medium for executing the processing.

It is to be understood that the foregoing process and the technique are not linked to the specific devices, and can be implemented by arbitrary combination of components. General purpose devices of various types can be used in the manner as described herein. It may be clarified that it is advantageous to construct the device exclusively for implementing the steps of the method as described above. The invention can be variously attained by appropriately combining multiple components disclosed in the embodiments. It is possible to eliminate some components from all those described in the examples. It is possible to appropriately combine components from different embodiments and examples. The disclosure has been described in reference to specific examples for the purpose of explanation from every possible point aspect rather than restriction. Any person skilled in the art on the basis of the description in the disclosure can readily understand that there are many combinations of hardware, software, and firmware, which are adapted to implementation of the disclosure. For example, the written software may be installed through the wide-range program or the script language, for example, assembler, C/C++, Peri, Shell, PHP, and Java®.

The foregoing embodiments and examples show the control lines and information lines which are considered as necessary for explanations. However, they do not necessarily indicate all the control lines and the information lines of the product. All the structures may be interconnected with one another.

Additionally, the person s killed in the relevant field may reasonably think of other implementation of the disclosure in the process of considering the specification and embodiments of the disclosure. Various forms and/or components according to the embodiments can be used independently or in arbitrary combination by the computerized storage system with data management function. The specification and specific examples have been described for illustrative purpose. The scope and spirit of the disclosure may be reflected in the following claims.

LIST OF REFERENCE SIGNS

1: capillary electrophoresis device
2: system control computer
1600: capillary electrophoresis system
1601: device control section
1602: motor/plunger drive section
1603: encoder/count value monitor section
1611: control section
1612: input/output device
1613: memory
1614: storage device
1615: communication device

The invention claimed is:

1. A measurement system comprising:

an electrophoresis device; and a computer, wherein the electrophoresis device includes a phoresis medium container for storing a phoresis medium, a capillary having its inside filled with the phoresis medium, and a delivery mechanism including a plunger for delivering the phoresis medium in the phoresis medium container to the capillary with a delivery pressure and a stepping motor which drives a ball screw attached to the plunger; and the computer is configured to control an operation of the delivery mechanism using the stepping motor which drives the ball screw attached to the plunger for controlling movement of the plunger to measure a delivery time taken for filling the capillary with the phoresis medium, and to change the delivery pressure by adjusting a drive current provided to the stepping motor to cause the plunger to move in response to a change in the delivery pressure estimated by the computer based on the delivery time and a predetermined relationship between the delivery time and the delivery pressure, to reduce the delivery pressure to be a predetermined pressure, and the computer is further configured to correct a set value of a delivery amount as a target delivery amount, and to correct an estimated delivery amount determined in consideration of a standard deviation in the delivery amount based on a volume expansion of the phoresis medium container and the changed delivery pressure.

2. The measurement system according to claim 1, wherein the computer is further configured to cause the phoresis medium in the phoresis medium container to be delivered to the capillary a predetermined deliverable number of times at the changed delivery pressure.

* * * * *